(12) United States Patent
Kolls

(10) Patent No.: US 6,604,085 B1
(45) Date of Patent: *Aug. 5, 2003

(54) UNIVERSAL INTERACTIVE ADVERTISING AND PAYMENT SYSTEM NETWORK FOR PUBLIC ACCESS ELECTRONIC COMMERCE AND BUSINESS RELATED PRODUCTS AND SERVICES

(75) Inventor: H. Brock Kolls, Downingtown, PA (US)

(73) Assignee: USA Technologies, Inc., Wayne, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/293,358

(22) Filed: Apr. 16, 1999

Related U.S. Application Data

(60) Provisional application No. 60/093,475, filed on Jul. 20, 1998.

(51) Int. Cl.[7] .............................................. G06F 17/60
(52) U.S. Cl. ........................................... 705/14; 705/26
(58) Field of Search ............................... 705/14, 1, 26; 700/231–244

(56) References Cited

U.S. PATENT DOCUMENTS 3,858,181 A    12/1974   Goldsby et al.

(List continued on next page.)

FOREIGN PATENT DOCUMENTS

EP    0822535 A2    8/1997

(List continued on next page.)

OTHER PUBLICATIONS

International Search Report, application No. 99/15938, dated Sep. 30, 1999.

(List continued on next page.)

*Primary Examiner*—Tariq R. Hafiz
*Assistant Examiner*—Susanna Meinecke-Diaz
(74) *Attorney, Agent, or Firm*—RatnerPrestia

(57) ABSTRACT

The present invention relates to a universal advertising and payment system for networking, monitoring and controlling electronic commerce and vending equipment. The system can effectuate electronic commerce and interactive advertising at the point of sale. Vending equipment includes copiers, phones, facsimile machines, printers, data-ports, laptop print stations, notebook computers, palmtop computers (PALM PILOT), microfiche devices, projectors, scanners, cameras, modems, communication access, personal computers (PC), PC terminals (NET PC), and network computers (NC). Vending equipment can be networked to each other through a first network, programmable and accessible by a PC, server, point of sale (POS) system, property or management information system (PMS/MIS), and networked to a second network. The first network and second network can be the same network. Complete control of a vending machine's functionality, including usage, control, diagnostics, inventory, and marketing data capture can be effectuated locally or by remote connection to the network. Remote connection to the network includes Internet type connections, telecommunication (telephone, ISDN, ADSL), VSAT satellite, and other wire and wireless transmission. The present invention allows a user to obtain authorization for use, pay for products and services, and configure the vending equipment with a smart card, or magnetic card (card). Magnetic cards include smart card, credit card, debit card, pre-paid, automated teller machine (ATM) or other bank or private issued card. Users can also use a hotel room key/card or other insertion type-identifying device. Additionally, biometric identification such as hand writing, voice, finger, hand, or eye (iris scan) can be utilized to control the system.

27 Claims, 23 Drawing Sheets

U.S. PATENT DOCUMENTS

| | | | |
|---|---|---|---|
| 4,086,434 A | 4/1978 | Bocchi | |
| 4,345,315 A | 8/1982 | Cadotte et al. | |
| 4,603,232 A | 7/1986 | Kurland et al. | |
| 4,624,578 A | 11/1986 | Green | |
| 4,669,596 A | 6/1987 | Capers et al. | |
| 4,700,296 A | 10/1987 | Palmer, Jr. et al. | |
| 4,725,949 A | 2/1988 | Dreher | |
| 4,727,243 A | 2/1988 | Savar | |
| 4,902,881 A | 2/1990 | Janku | |
| 4,904,851 A | 2/1990 | Yukino | |
| 5,036,472 A | 7/1991 | Buckley et al. | |
| 5,179,695 A | 1/1993 | Derr et al. | |
| 5,220,501 A | 6/1993 | Lawlor et al. | |
| 5,247,575 A | 9/1993 | Sprague et al. | |
| 5,287,505 A | 2/1994 | Calvert et al. | |
| 5,329,589 A | 7/1994 | Fraser et al. | |
| 5,333,181 A | 7/1994 | Biggs | |
| 5,337,253 A | 8/1994 | Berkovsky | |
| 5,339,239 A | 8/1994 | Manabe et al. | |
| 5,355,414 A | 10/1994 | Hale et al. | |
| 5,377,269 A | 12/1994 | Heptig et al. | |
| 5,393,964 A | 2/1995 | Hamilton et al. | |
| 5,396,546 A | 3/1995 | Remillard | |
| 5,442,771 A | 8/1995 | Filepp et al. | |
| 5,445,295 A | 8/1995 | Brown | |
| 5,446,906 A | 8/1995 | Kardach et al. | |
| 5,450,938 A | 9/1995 | Rademacher | |
| 5,500,890 A | 3/1996 | Rogge et al. | |
| 5,504,675 A | 4/1996 | Cragun et al. | |
| 5,513,116 A | 4/1996 | Buckley et al. | |
| 5,513,117 A | 4/1996 | Small | |
| 5,546,316 A | 8/1996 | Buckley et al. | |
| 5,550,746 A | 8/1996 | Jacobs | |
| 5,557,721 A | 9/1996 | Fite et al. | |
| 5,559,714 A | 9/1996 | Banks et al. | |
| 5,561,604 A | 10/1996 | Buckley et al. | |
| 5,572,572 A | 11/1996 | Kawan et al. | |
| 5,602,905 A | 2/1997 | Mettke | |
| 5,604,802 A | 2/1997 | Holloway | |
| 5,608,643 A | 3/1997 | Wichter et al. | |
| 5,613,012 A | 3/1997 | Hoffman et al. | |
| 5,614,703 A | 3/1997 | Martin et al. | |
| 5,637,845 A * | 6/1997 | Kolls | 235/381 |
| 5,642,805 A | 7/1997 | Tefft | |
| 5,664,110 A | 9/1997 | Green et al. | |
| 5,696,965 A | 12/1997 | Dedrick | |
| 5,699,528 A | 12/1997 | Hogan | |
| 5,710,887 A | 1/1998 | Chelliah et al. | |
| 5,714,741 A | 2/1998 | Pieterse et al. | |
| 5,715,314 A | 2/1998 | Payne et al. | |
| 5,724,424 A | 3/1998 | Gifford | |
| 5,724,521 A | 3/1998 | Dedrick | |
| 5,726,898 A | 3/1998 | Jacobs | |
| 5,727,129 A | 3/1998 | Barrett et al. | |
| 5,731,576 A | 3/1998 | Valadier | |
| 5,732,219 A | 3/1998 | Blumer et al. | |
| 5,737,729 A | 4/1998 | Denman | |
| 5,745,882 A | 4/1998 | Bixler et al. | |
| 5,764,639 A | 6/1998 | Staples et al. | |
| 5,768,142 A | 6/1998 | Jacobs | |
| 5,778,067 A | 7/1998 | Jones et al. | |
| 5,778,173 A | 7/1998 | Apte | |
| 5,781,894 A | 7/1998 | Petrecca et al. | |
| 5,794,210 A | 8/1998 | Goldhaber et al. | |
| 5,794,234 A | 8/1998 | Church et al. | |
| 5,798,931 A | 8/1998 | Kaehler | |
| 5,799,067 A | 8/1998 | Kikinis et al. | |
| 5,806,993 A | 9/1998 | Petterutti et al. | |
| 5,812,765 A | 9/1998 | Curtis | |
| 5,819,092 A | 10/1998 | Ferguson et al. | |
| 5,822,216 A * | 10/1998 | Satchell, Jr. et al. | 364/479.01 |
| 5,822,739 A | 10/1998 | Kara | |
| 5,844,808 A | 12/1998 | Konsmo et al. | |
| 5,845,261 A | 12/1998 | McAbian | |
| 5,848,396 A | 12/1998 | Gerace | |
| 5,854,897 A | 12/1998 | Radziewicz et al. | |
| 5,875,110 A | 2/1999 | Jacobs | |
| 5,878,141 A | 3/1999 | Daly et al. | |
| 5,903,652 A | 5/1999 | Mital | |
| 5,909,670 A | 6/1999 | Trader et al. | |
| 5,930,771 A | 7/1999 | Stapp | |
| 5,933,811 A | 8/1999 | Angles et al. | |
| 5,933,816 A * | 8/1999 | Zeanah et al. | 705/35 |
| 5,940,811 A | 8/1999 | Norris | |
| 5,946,646 A | 8/1999 | Schena et al. | |
| 5,948,061 A | 9/1999 | Merriman et al. | |
| 5,960,411 A | 9/1999 | Hartman et al. | |
| 5,963,452 A | 10/1999 | Etoh et al. | |
| 5,970,473 A | 10/1999 | Gerszberg et al. | |
| 5,978,840 A | 11/1999 | Nguyen et al. | |
| 5,987,430 A | 11/1999 | Van Horne et al. | |
| 5,987,498 A * | 11/1999 | Athing et al. | 709/203 |
| 5,991,411 A | 11/1999 | Kaufman et al. | |
| 5,997,170 A | 12/1999 | Brodbeck | |
| 6,009,410 A | 12/1999 | LeMole et al. | |
| 6,021,362 A | 2/2000 | Maggard et al. | |
| 6,029,150 A | 2/2000 | Kravitz | |
| 6,029,851 A | 2/2000 | Jenkins et al. | |
| 6,038,491 A | 3/2000 | McGarry et al. | |
| 6,055,513 A | 4/2000 | Katz et al. | |
| 6,070,795 A | 6/2000 | Feiken | |
| 6,073,840 A * | 6/2000 | Marion | 235/381 |
| 6,101,485 A | 8/2000 | Fortenberry et al. | |
| 6,115,649 A | 9/2000 | Sakata | |
| 6,118,860 A | 9/2000 | Hillson et al. | |
| 6,141,010 A | 10/2000 | Hoyle | |
| 6,161,059 A * | 12/2000 | Tedesco et al. | 700/232 |
| 6,167,387 A | 12/2000 | Lee Wai Yin | |
| 6,181,981 B1 | 1/2001 | Varga et al. | |
| 6,182,050 B1 | 1/2001 | Ballard | |
| 6,189,029 B1 | 2/2001 | Fuerst | |
| 6,189,787 B1 | 2/2001 | Dorf | |
| 6,195,694 B1 | 2/2001 | Chen et al. | |
| 6,205,437 B1 | 3/2001 | Gifford | |
| 6,216,112 B1 | 4/2001 | Fuller et al. | |
| 6,223,984 B1 | 5/2001 | Renner et al. | |
| 6,230,150 B1 | 5/2001 | Walker et al. | |
| 6,233,564 B1 | 5/2001 | Schulze, Jr. | |
| 6,233,565 B1 | 5/2001 | Lewis et al. | |
| 6,236,975 B1 | 5/2001 | Boe et al. | |
| 6,260,758 B1 | 7/2001 | Blumberg | |
| 6,264,104 B1 | 7/2001 | Jenkins et al. | |
| 6,266,647 B1 | 7/2001 | Fernandez | |
| 6,282,522 B1 | 8/2001 | Davis et al. | |
| 6,285,987 B1 | 9/2001 | Roth et al. | |
| 6,292,668 B1 | 9/2001 | Alanara et al. | |
| 6,330,582 B1 | 12/2001 | Kuo et al. | |
| 6,330,978 B1 | 12/2001 | Molano et al. | |
| 6,345,263 B1 | 2/2002 | Matsumoto et al. | |

FOREIGN PATENT DOCUMENTS

| | | |
|---|---|---|
| WO | WO91/07839 | 5/1991 |
| WO | WO94/04446 | 3/1994 |
| WO | WO 95/16971 | 6/1995 |
| WO | WO95/26004 | 9/1995 |
| WO | WO96/05564 | 2/1996 |
| WO | WO96/15505 | 5/1996 |
| WO | WO96/21314 | 7/1996 |
| WO | WO96/22652 | 7/1996 |
| WO | WO96/30864 | 10/1996 |
| WO | WO97/23838 | 7/1997 |

| WO | WO97/28510 | 8/1997 |
| WO | WO97/45796 | 12/1997 |
| WO | WO98/40826 | 9/1998 |
| WO | WO99/30291 | 6/1999 |
| WO | WO 99/62013 | 12/1999 |

OTHER PUBLICATIONS

International Search Report, application No. 99/15937, dated Sep. 30, 1999.

International Search Report, application No. 99/15922, dated Sep. 30, 1999.

Bluetooth ™ Brochure.

Harris, Arthur F.M., "How to Determine Your Unrelated Income from Advertising," Association Management vol. 28, No. 5, Abstract.

Kosiur, David. Understanding Electric Commerce, Microsoft Press.

Microsoft Press Computer Dictionary ($3^{rd}$ Ed.) Microsoft Press pp. 290 and 355 Aug. 1997.

Simon, Alan R., Data Warehousing for Dummies, IDG Books.

Steinke, Steve. "The Internet Turns Pushy" Network v.12, n.6, p. 87(5) Jun. 1997.

USA Technologie,s "TransAct", http://web.archive.org, Oct. 1997.

USA Technologies, "USA Technologies Inks Deal With Choice Hotels International to Install Business Express", Press Release, Apr. 23, 1997.

William, Saffady, "CARL Corporation", Library Technology Reports, vol. 33, No. 2, p. 171, Mar.–Apr. 1997.

* cited by examiner

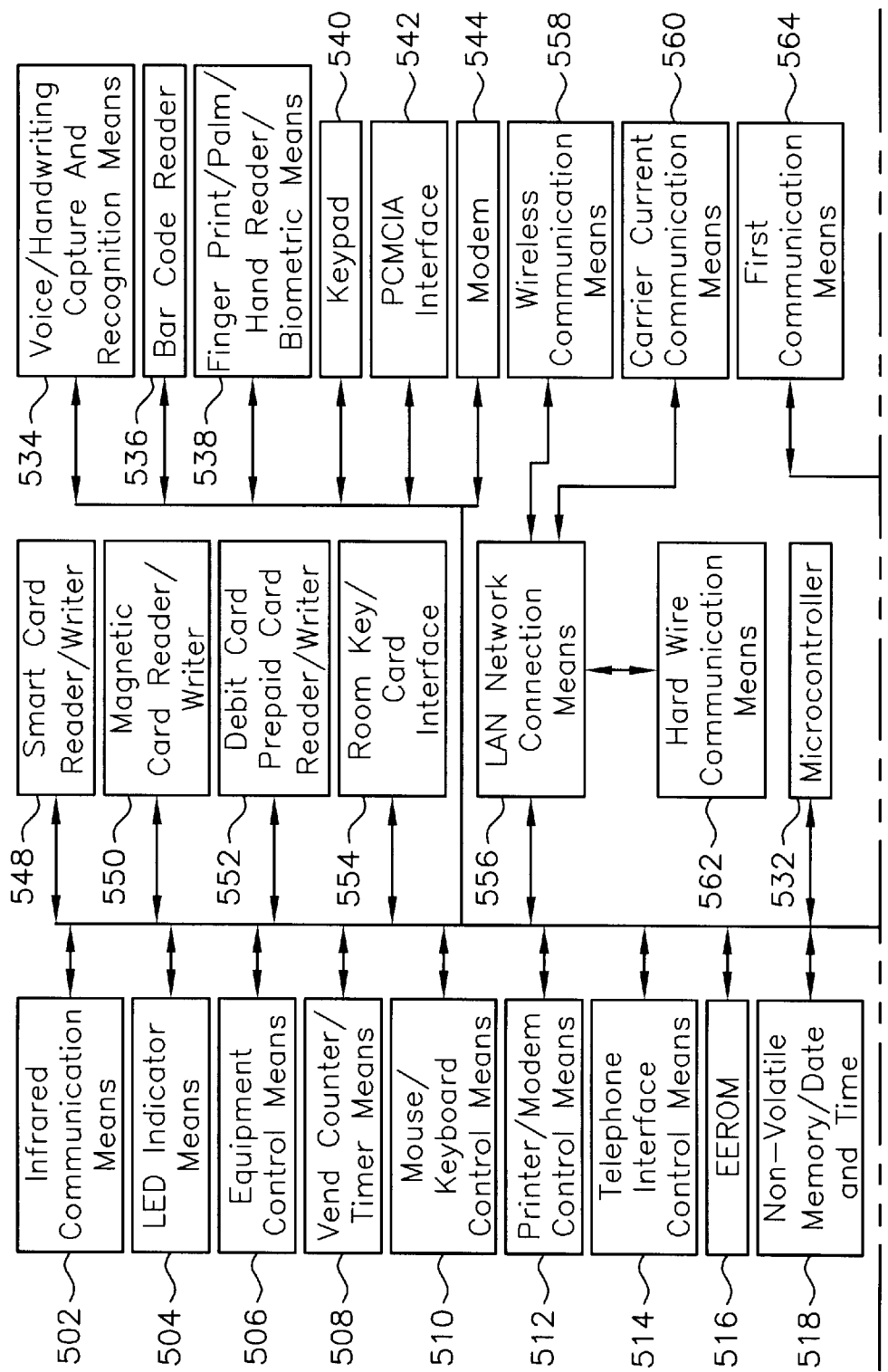

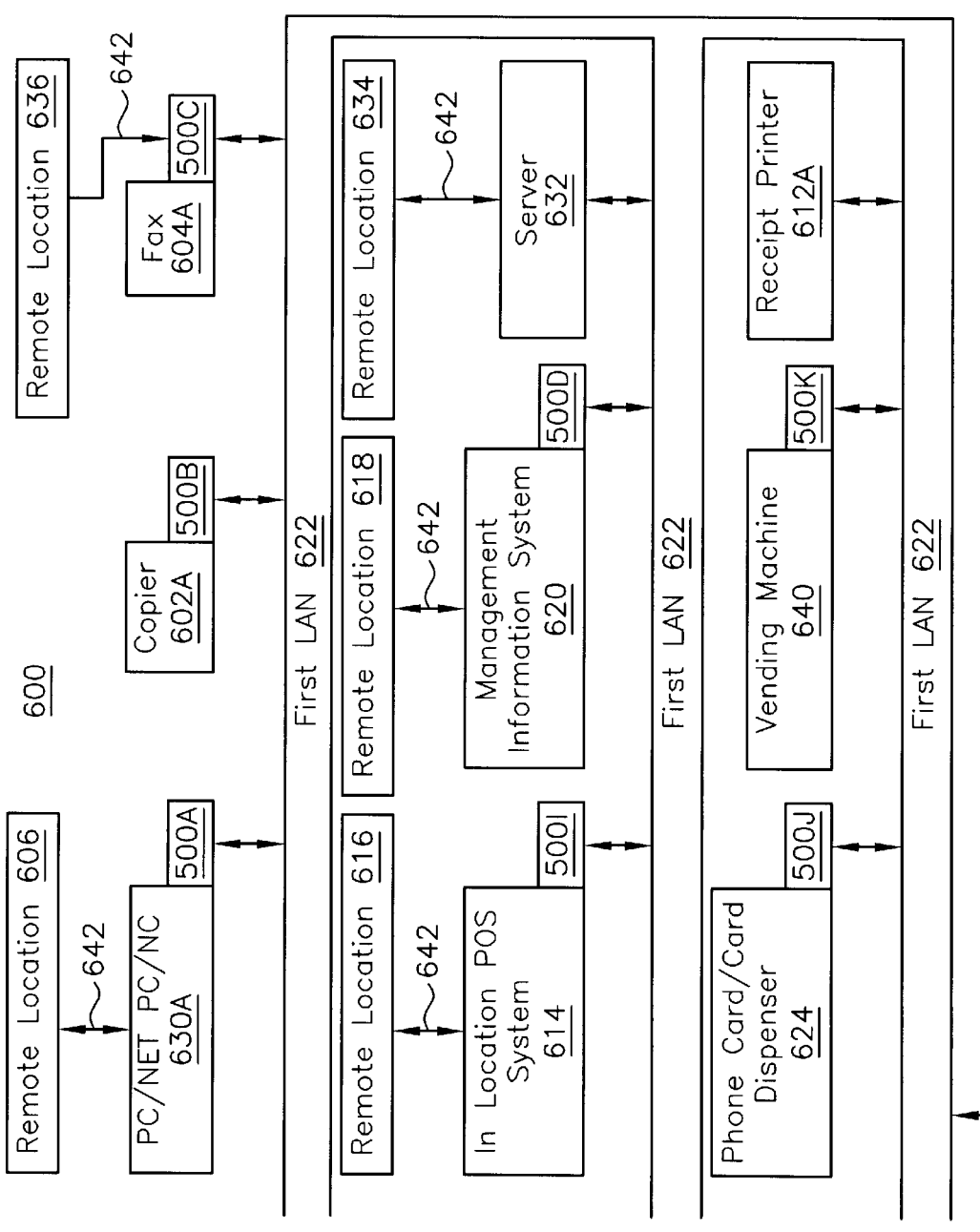

UNIVERSAL INTERACTIVE ADVERTISING AND PAYMENT SYSTEM NETWORK FOR PUBLIC ACCESS ELECTRONIC COMMERCE AND BUSINESS RELATED PRODUCTS AND SERVICES

RELATED APPLICATIONS

This application claims priority of a U.S. provisional application Serial No. 60/093,475, inventor H. Brock Kolls, entitled UNIVERSAL INTERACTIVE ADVERTISING AND PAYMENT SYSTEM FOR PUBLIC ACCESS ELECTRONIC COMMERCE AND BUSINESS RELATED PRODUCTS AND SERVICES, filed on Jul. 20, 1998.

TECHNICAL FIELD OF THE INVENTION

The present invention relates to a universal advertising and payment system for networking, monitoring, collecting data, selling goods and services, controlling interactive advertising, controlling and effectuating electronic commerce and controlling vending equipment. The present invention also relates to physical and virtual networking of vending machines and network hardware, server based network control, and network security. The present invention can be implemented in a manner to allow operational monitoring and control of networks (and network hardware), vending machines, electronic commerce, payment for goods and services, and advertising worldwide.

BACKGROUND OF THE INVENTION

Today, business centers have begun to emerge in hotel lobbies, retail outlets, shopping malls, airports, and other public access areas. A typical business center can offer copying, and faxing, among other types of products and services. Furthermore, some business centers even make a PC available for general computing tasks, printing, or access to online services. Generally, there are two types of business center classifications, the "manned center" and the "unmanned center."

The "manned center" can include an employee to provide services, collect money, perform tasks and supervise the use of the center. The "unmanned center" typically does not require an employee and can include a copier, a fax and a PC. The "unmanned center" can be coin-cash-card activated, or may be offered as a "free" amenity service to customers.

A drawback of the "manned center" can be the reliance on paid employees. These employees can have a high operating cost. Before a "manned center" becomes profitable, revenues from the business center may have to pay for the cost of the employees required to operate the center. In many business centers, reliance on, and cost of employees can prevent the center from being profitable. Thus, certain "manned centers" may not offer an economically viable, or profitable business model to their owners.

Additionally, another drawback in the "manned center" can be limited hours of access and operation. Most "manned centers" are "open" for business for a finite number of hours during the day, and can be "closed" in the evenings and on the weekends. As a result of the limited "open" hours and reduced accessibility of services to customers, a significant amount of a business center's potential revenue can be lost or otherwise unrealized. Most business travelers are out of the hotel on business calls during the day when the "manned center" is "open". When the customer returns to the hotel in the evening to use the "manned center," they may find it closed for the day.

Retail business centers, such as MAIL BOXES ETC. ("MBE"), KINKO'S, SIR SPEEDY, and ALPHA GRAPHICS may operate their businesses in a "manned center" format. This can lead to the inability to meet customer needs after hours, and may result in a loss of business related revenues. For example, when a MBE store is "closed" to the public for full service, a 24 hours access area can remain "open" for MBE member-customers to access their mailboxes. This minority group of business members may have limited access to some business-related services, such a copying. The general public on the other hand, not having a prearranged membership, can not use these services. Business from these potential customers is lost. Subsequently, MBE stores can suffer the same drawbacks as the "manned center." These retail locations will continue to lose revenue during the times the stores are "open" for access to member-customers but "closed" to the general public.

An "unmanned" business center can be open for business 24-hours a day. This type of center typically relies on coin-cash-card systems to activate the business center's equipment. The type of card accepted is a magnetic card which includes a credit card, a smart card, a debit card, a pre-paid, automated teller machine ("ATM") or other bank or private issued card. Coin-cash-card systems are well known for copiers, however, for faxing, PC's, and other types of vending equipment and services, reliance on these types of systems alone can be awkward and in certain situations impractical. As a result, certain services such as faxing, and computing may not be available to customers, or offered to customers with limited service functionality.

An "unmanned center" relying on coin activated copiers and fax machines may offer little in the way of security and safety to the equipment. Furthermore, by accumulating money in coin boxes, the risk of break-ins, damage and theft can be increased. A service attendant may be required to remove money from the coin boxes at a periodic interval, adding an additional level of labor, and increasing the potential of theft. Also, customers using a coin or cash operated business center could find themselves without sufficient monetary means to pay for products and services, as coin changers and ATMs, or other cash access means may not be readily available.

Brand standard or loyalty programs ("loyalty programs") that offer a customer a promotional reward, discount or other incentive for repeated use of a business center or repeated visits to a hotel or store can be difficult to implement at a "manned center," or in a coin-cash-card based "unmanned center. " A potential limitation of current "manned center" and "unmanned center" business centers, as related to the management of a loyalty program, can be tracking and recording customer usage specific to a group of locations, hotel brand or chain, particular business center, or brand-chain of retail outlet worldwide.

In many hotels and retail outlets, the addition of a business center can represent a new business model, method, or proposition. As such, financial accounting for a business center can be difficult for an owner, or operator unaccustomed to managing this type of business. Furthermore, most businesses having established a method of business operations for their core business and can find business center accounting a new and undesirable burden. For example, in many retail outlets the store is managed from a point of sale terminal ("POS") system. A business center that can not be integrated into the store's POS system, can add an additional level of accounting burden for the storeowner. Corporate headquarters that remotely manage a population of franchised locations can struggle in managing business centers located in their franchised locations, in combination with business centers located in non-traditional business sites, such as in hotels. A further example can be in a hotel, where the hotel is managed from a system that tracks guests, rooms, and the like. A business center's inability to integrate into a management information system ("MIS") or the hotel's property management information system ("PMS") can be burdensome to the hotel, and to the hotel's customer.

A number of reasons support the long felt need of the present invention including the deficiencies and shortcomings of the "manned center" and coin-cash-card based "unmanned center." The deficiencies and shortcomings of the "manned center" can include limited hours of operation, and a likelihood that employee costs could adversely effect the profitability of the center.

Deficiencies and shortcomings of the cash-coin-card based "unmanned center" can include a lack of security/safety to equipment and money accumulating in coin boxes. Furthermore, inadequate payment systems can result in reduced profits, limited functionality of vending products and services. Cash and coin systems can increase reliance on service attendants required to collect money from the coin boxes.

Deficiencies and shortcomings that are common to both the "manned center" and coin-cash-card based "unmanned center" are numerous. These shortcomings can include the inability to implement and offer a worldwide brand/loyalty program to customers, and the inability to have interactive marketing (advertising) distributed worldwide at the point of sale. Further shortcomings include the inability to integrate into or retrofit onto existing POS and PMS/MIS systems, as well as other retail, management, and corporate networks. Another limitation includes the inability to accept a universal variety of payment means such as coin, cash, smart card, magnetic card, biometric input, and room keys/card to name a few.

SUMMARY OF THE INVENTION

The present invention is embodied in a simple and effective system and method for a universal control and payment system to distribute and display interactive advertising, conduct electronic commerce, and control the billing for the use of vending equipment. Vending equipment can include copiers, phones, facsimile machines, printers, data-ports, laptop print stations, notebook computers, palmtop computers (PALM PILOT), microfiche devices, projectors, scanners, cameras, modems, communication access, personal computers (PC), PC terminals (NET PC), and network computers (NC).

One aspect of the present invention provides a system for public access to electronic commerce. More specifically, the present invention can control, monitor, and effectuate electronic commerce transactions such that the general public can use the present invention as a public access electronic commerce station.

Another aspect of the present invention provides the ability to route credit card and other types of transactions, allowing credit card and other types of transactions to be processed in an online environment.

Another aspect of the present invention provides a system for networking of public access electronic commerce terminals. These terminals can be deployed worldwide and networked together, with control of the terminals effectuated through at least one universal server.

It, is understood that both the foregoing general description and the following detailed description, are exemplary, but are not restrictive of the invention.

BRIEF DESCRIPTION OF FIGURES

The present invention is best understood from the following detailed description when read in connection with the accompanying drawings. Included in the drawings are the following figures.

DETAILED DESCRIPTION OF THE INVENTION

Figure 1:
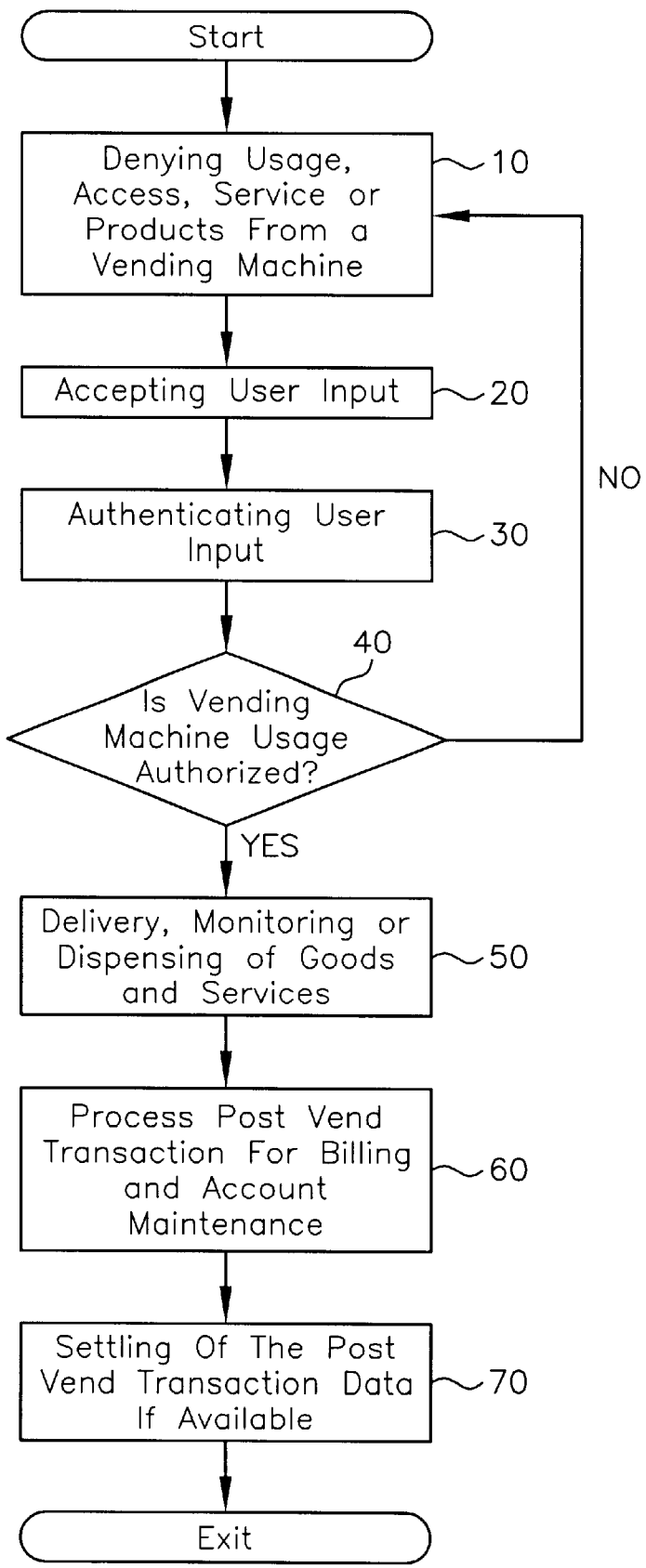
FIG. 1 shows a flowchart illustrating a high level chart of the invention.

FIG. 1 shows an overview of the universal interactive advertising and payment system for vending of public access electronic commerce and business related products and services. The universal interactive advertising and payment system is a computer program which may reside in a carrier, such as a disk, diskette or a modulated carrier wave.

A vending machine is defined as any piece of equipment in which products and/or services can be rendered therefrom. Referring again to FIG. 1, control of a vending machine (referred to as VENDING MACHINE USAGE) can involve a first step of denying usage, access, service, or products from the vending machine as shown in step 10. Next, in step 20 the system accepts user input (data and/or monetary, disclosed herein as PRE-VEND TRANSACTION DATA (i.e. "AUTHORIZATION")), and then in step 30, the system authenticates or verifies the user's input to determine if VENDING MACHINE USAGE is "authorized." If, in step 40, VENDING MACHINE USAGE is "authorized" the processing proceeds to step 50. In step 50, the system effectuates the delivery, monitoring, and dispensing of the product, and/or service. Then, in step 60, the system processes the POST-VEND TRANSACTION DATA to effectuate user (customer) billing, and account maintenance. Lastly, in step 70, the system "settles" (effectuates the transfer of funds, i.e. payment) the POST-VEND TRANSACTION DATA.

Step 70 can be optional when a PRE-VEND TRANSACTION can both satisfy the requirements of step 40, "authorization" and step 70, "settling." Examples of when Step 70 may not be required, can include vending of a product or service when at the time of creating the PRE-VEND TRANSACTION DATA (i.e. the "authorization") the exact amount of the total sale is known. Other examples of when step 70 may not be required can include creating PRE-VEND TRANSACTION DATA (i.e. the "authorization") where no bill for the product or service will be incurred by the user (customer) (i.e. products and/or services for a particular user are "free").

Figure 2:
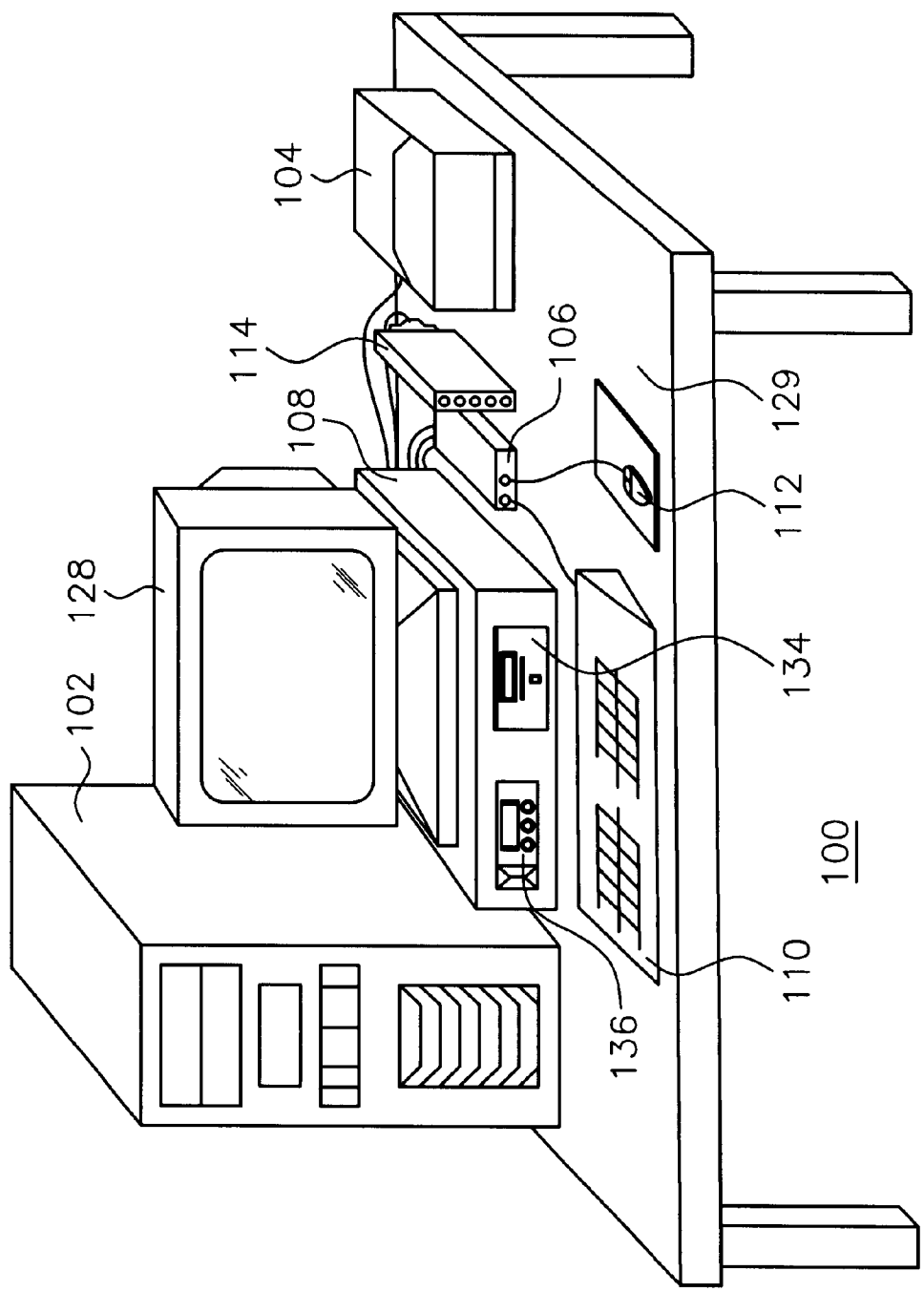
FIG. 2 shows an example of a public personal computer system.

One example of a vending machine is shown in FIG. 2, a personal computer system, known as a system 100. The arrangement on table 129 is comprised of a PC 102, a monitor 128, a transaction control device 108 (shown in an exemplary embodiment as a combination of a magnetic card terminal 136 and debit card reader-writer 134 packaged together), a keyboard 110, a modem 114, a mouse 112, a printer 104 and a controller 106.

A reliable way to govern the use of a PC system and its various components is to effectuate control of the mouse 112, keyboard 110, printer 104, modem 114, telecommunication lines (phone, ISDN, ADSL) and other peripheral devices. A PC system which has a mouse and keyboard under regulated control of a transaction control device 108 (such transaction control device capable of placing the mouse and keyboard in an inoperable state) can effectively prevent unauthorized use of the PC system. With an inoperable keyboard, an unauthorized user can not make typographic input. Furthermore, an inoperable mouse prevents an unauthorized user from selecting functions or features, entering selections or choices or executing control of software programs. To further enhance and secure a PC system, regulating control of other components of the PC system can also be implemented.

A transaction control device 108 is defined as any device that can accept coins, currency, magnetic cards, smart cards, credit cards, debit cards or other value storing medium and is capable of communicating a set of qualifying/disqualifying data or enabling/disabling data to a second control device. Transaction control devices such as a debit card reader-writer, a coin or currency activated device or a credit card terminal provide a means for indicating to external peripheral devices that a set of satisfying criteria has been met and allowance of system use is granted (an enabling signal).

FIGS. 3A–3D show an exemplary embodiment for the present invention, an unattended business center in which product and services can be vended. The control of a vending machine can include monitoring and accounting for products and services rendered from the vending machine. Vending machines can include copiers such as copiers 602A–602F, phone data-port combinations such as phone 648, facsimile machines such as fax 604A–604B, and printers such as printer 104 and printer 69A–612G. Other types of vending machines can include, laptop/palm computer print stations such as laptop print station 646, microfiche devices (not shown), projection equipment (not, shown), scanners (not shown), and digital cameras (not shown). Additionally, peripherals such as personal computers (PC) 102/630, personal computer terminal (NET PC) 630, and network computer (NC) 630, as well as traditional vending machines can be referred to generally as vending machines.

A personal computer (PC)-PC terminal (NET PC)-network computer (NC) 630 can be a PC 102 and can be a PC-NET PC-NC 630A–630D. PC-NET PC-NC 630A–D and PC 102 can be referred to as PC-NET PC-NC 630 or generally as a PC 630. A NET PC can be a PC with a network connection to a server. Furthermore, a NET PC can rely on and utilize services remotely over the network. NET PC services can include software, access to the Internet, access to remote locations, access to other online services, as well as access to other data transmission mediums. These additional transmission mediums can include a telecommunication service (wired and wireless), a telephone, integrated service digital network (ISDN), an asymmetric digital subscriber line (ADSL), a very small aperture transmission (VSAT) satellite, a cable modem, and a T1 telecommunication line. A NC is a network computer reliant on a server for many computing functions. Such computing functions can include remote software access, access to the Internet, remote locations, other online services, as well as access to other data transmission mediums such as telecommunication service (wired and wireless), telephone, ISDN, ADSL and VSAT satellite. Furthermore, the NC can rely on an on-site, off-site remote, Internet, or other data connections to establish data communications with a single server or multiple servers.

PC 630 can be a specialized PC, which through software prevents a user from functionally using the PC 630 until a satisfying condition or state, is presented. Upon receipt of the satisfying criteria, PC 630 by way of software intervention allows a user to functionally use the PC 630. A unique feature of this form of PC is that while software grants and denies access to the PC system, software continues to oversee the user's activities, choosing to intervene and prevent the user from performing certain functions. Functions that can be blocked are those that comprise system security, including access to hardware, access to hardware settings, access to software, and or access to software settings. This specialized form of a PC 630 can generally be referred to as a public PC. For purposes of disclosure this form of PC will be referred to as a PC 630.

Vended products from a vending machine can include usage time, device usage count, printed output, copies, printed pages, fax transmissions, and other related supplies (e.g. food, beverage, staplers, film, rubber bands, paper clips, note pads, computer disks, pens, and pencils). Vended services from a vending machine can include charging for usage time of a PC-NET PC-NC 630, charging for usage time of online services, access to program applications, or databases, and charging for electronic commerce transactions.

A public access electronic commerce terminal is a computing device, such as a system 500. A public access electronic commerce terminal can effectuate control of a vending machine as required while allowing a user of the system to view, vend, respond to, or purchase from displayed interactive advertising. Furthermore, a user can make general inquires and obtain other information related to the interactive advertising from a public access electronic commerce terminal. A system 500 can be a public access electronic terminal. A system 500 can also be a transaction control device, such as a transaction control device 108.

The ability to view, vend, obtain information, respond to, or purchase from displayed interactive or electronic advertising by way of an electronic computing device is generally referred to as an electronic commerce transaction or as electronic commerce. A system 500 can also be an electronic computing device.

A typical business center can be comprised of a plurality of vending equipment. A business center can include a copier 602A, a fax machine 604A, a laptop/palmtop print station 646, a data-port/phone 648, and a PC-NET PC-NC 630 (PC 630). Furthermore, many business centers and retail outlets (store or location) require a plurality of copiers 602, a plurality of faxes 604, a plurality of PCs 630, and other vending equipment to meet the needs of their customers. A control system, and operational method which can interface and control a plurality of different types of vending equipment is also required. It is also desirable that each vending machine is networked to share resources and reduce undue duplication, and expense of equipment. For example, when printing a customer receipt is required, a single printer on the network can allow a plurality of vending machines to share the single printer. Furthermore, networking vending machines in a business center, or a retail outlet facility enables shared transaction processing capabilities and allows system integration with existing POS, PMS/MIS, and other network systems. A management information system (MIS) can be a POS system or a PMS system.

Figure 3A:
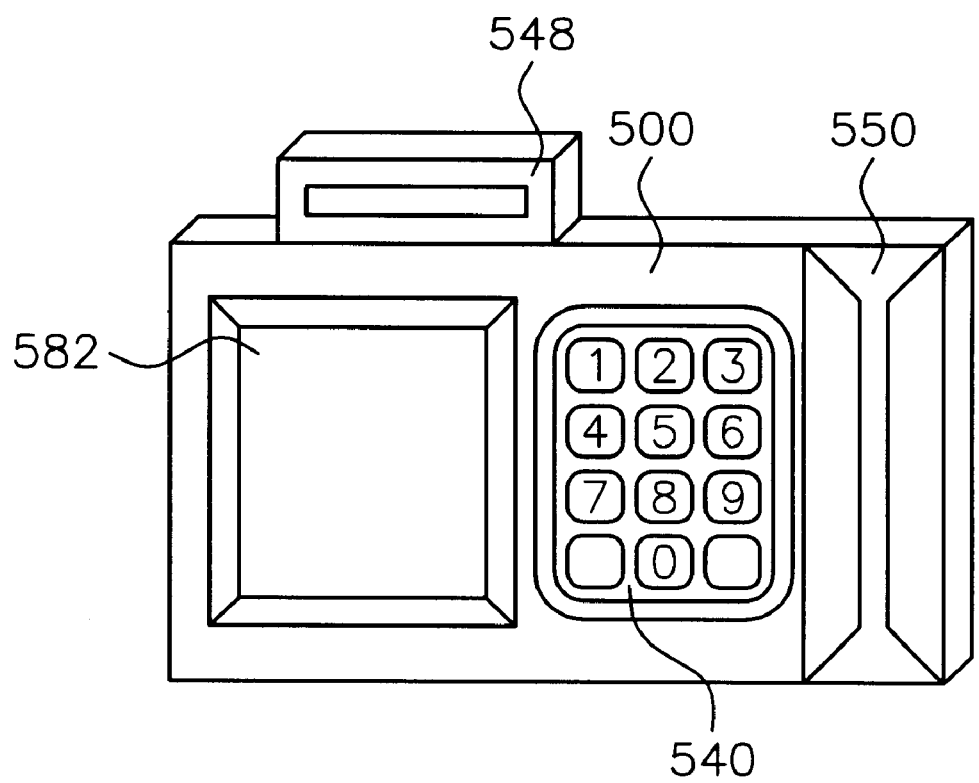
FIGS. 3A–3D shows a plurality of business center configurations showing system 500 integration.

Referring g again to FIGS. 3A–3D, there is shown an unattended business center, which includes a plurality of systems 500. Referring to FIG. 3A, there is shown a system 500 with a first display means 582, a smart card reader/writer 548, a keypad 540 and a magnetic card acceptor 550. Additional interface components (not shown) can be interfaced to system 500 to allow the acceptance of other identity forms such as keys, and biometrics.

Figure 3B:
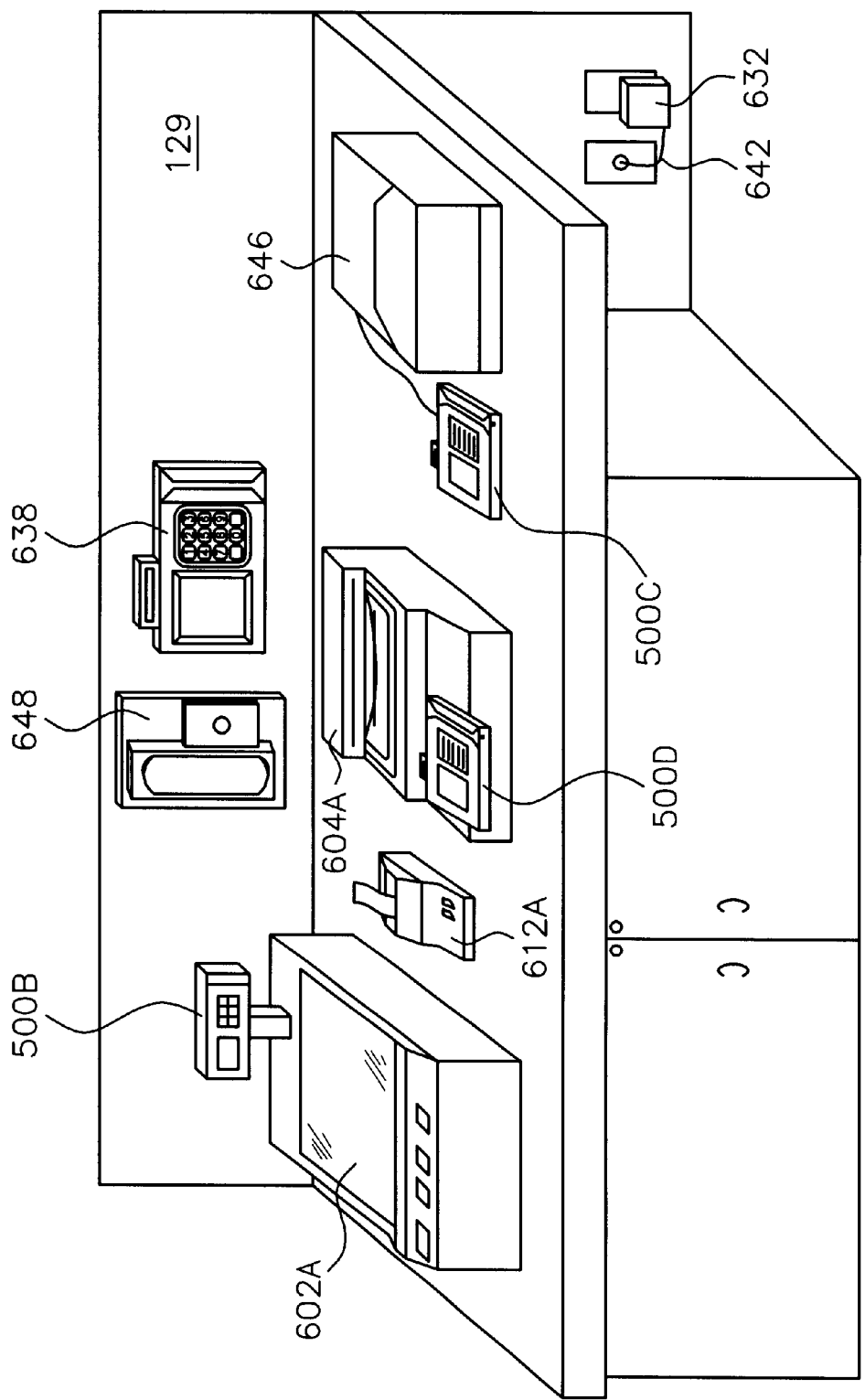

Referring to FIG. 3B, there is shown business center furniture, referred to as table 129 on which is shown a copier 602A interconnected with a system 500B. A system 500B can be a system 500. Also shown on table 129 is a printer 69A, data-port/phone 648, a smart card re-value station 638, and a laptop/palmtop print station 646 interconnected with a system 500C. A system 500C can be a system 500. A re-value station 638 can be a system 500. A data-port/phone 648 can include or be operated by a system 500. Also shown is a server 632 interconnected with a telecommunication line 642. Telecommunication line .642 can be a VSAT connection or other network type connection.

Figure 3C:
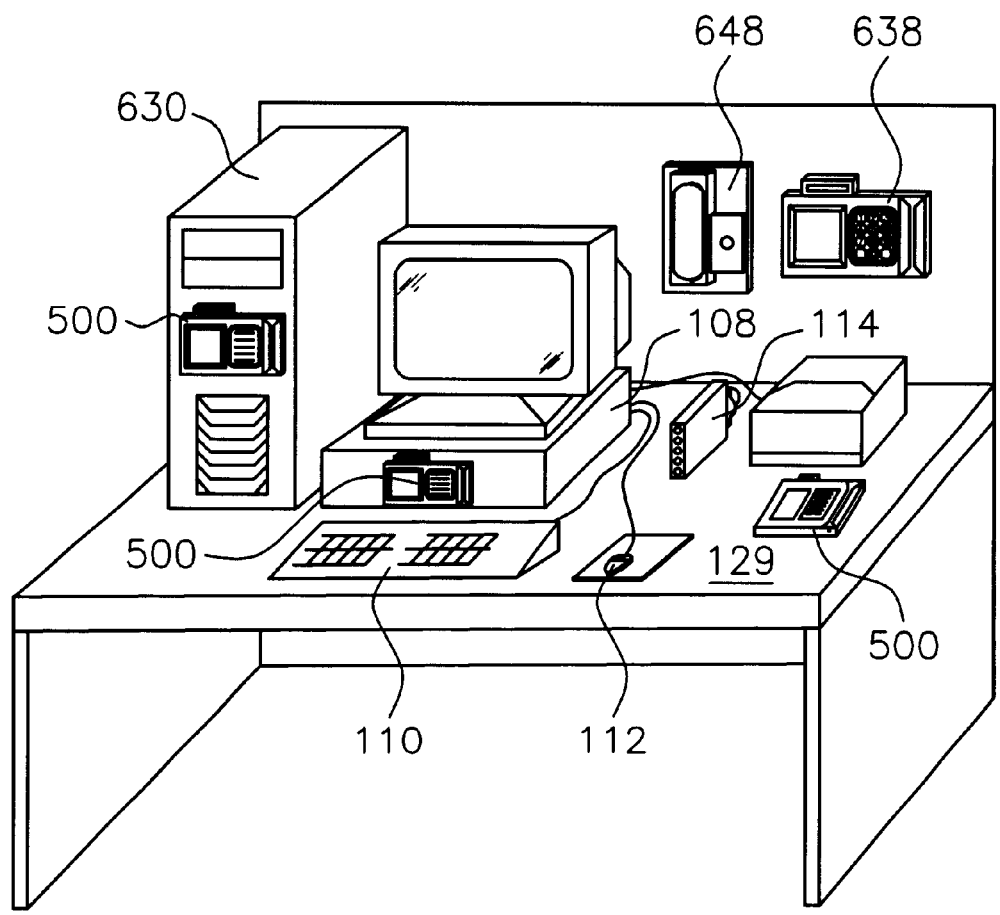

Referring to FIG. 3C, there is shown a computer workstation to illustrate a plurality of exemplary embodiments of how a system 500 can be integrated into, and control the use of a PC 630. Although in an exemplary embodiment only a single system 500 is required to effectuate control of a PC 630, several systems 500 are shown to illustrate how a system 500 can be mounted, or implemented to control a PC 630 in a variety of exemplary ways.

Figure 3D:
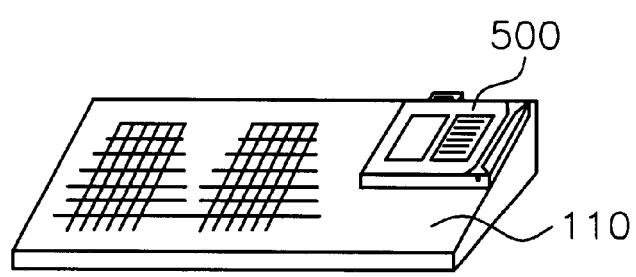

A computer desk referred to as table 129 is shown on which is placed a printer 104, and a keyboard 110. Also, on table 129 there is shown a PC 630. A system 500 can be integrated into the PC 630, whereby control of PC 630 can be effectuated. Furthermore, there is shown a monitor 128 with a system 500 integrated into the monitor 128, whereby control of a PC 630 can be effectuated. There is also shown a system 500 mounted to the table 129, whereby control of a PC 630 can be effectuated. Additionally, there is shown in FIG. 3D a keyboard 110 with a system 500 integrated into keyboard 110, whereby control of a PC 630 can be effectuated.

Figure 4B:
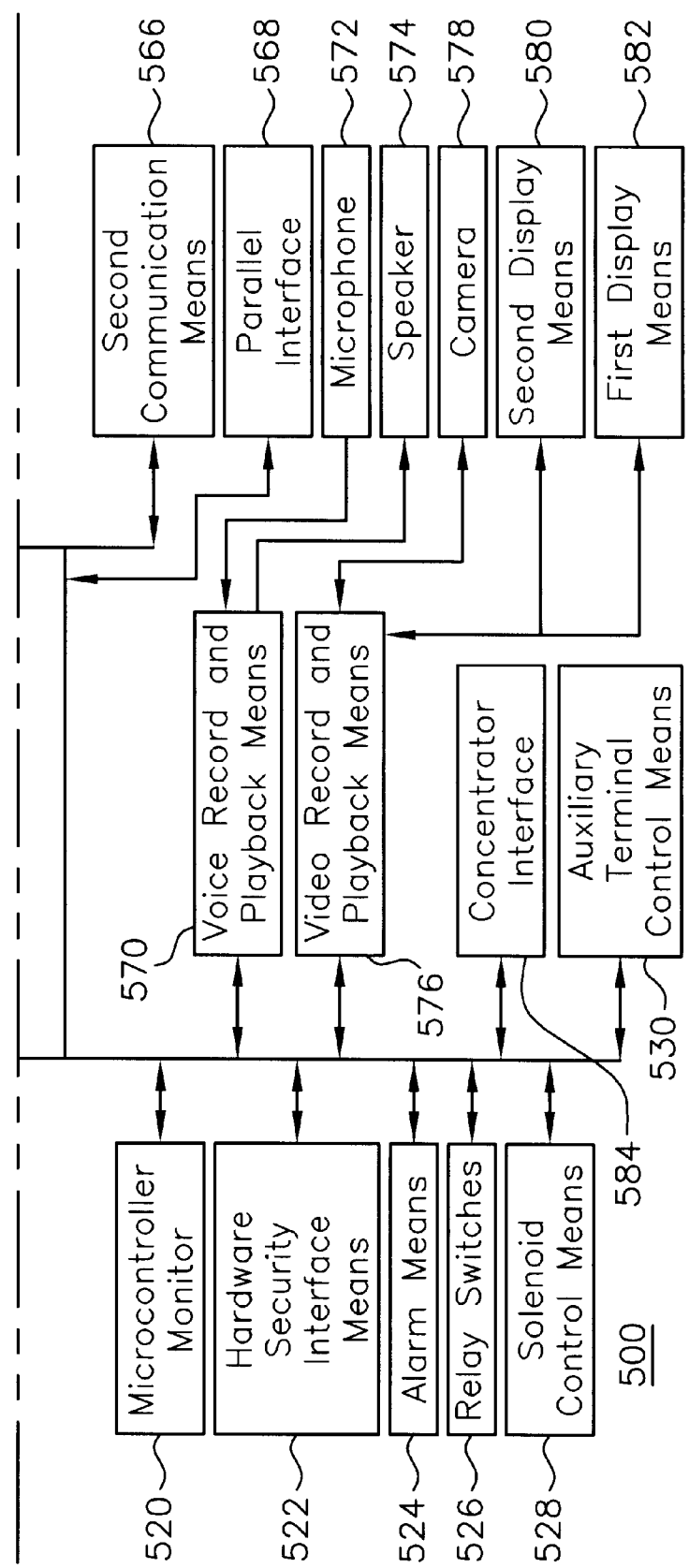
FIG. 4 shows a system 500 block diagram.

There is shown in FIG. 4, a system 500. The system 500 includes numerous mutually exclusive control means. In a plurality of customer specifications and where customer cost considerations demand, there may, arise a situation where a system 500 may not contain or require the use of certain features or functions. Accordingly, a, system 500 can easily be manufactured to include or exclude a specific combination of control means to produce the desired control result at a desirable cost to a customer. For example, a customer may desire to operate a system 500 without an infrared communications means 502. In such a case, a system 500 could be manufactured with the omission of specific control means, such as infrared communications means 502. In any combination, the same inclusion or exclusion of control means can be applied to other control means and to the system 500 in general.

Interconnected with a microcontroller 532 is an infrared communications means 502 whereby data communication between microcontroller 532 and a device external to a system 500 can data communicate. A microcontroller 532 can be a controller 106 and can be implemented with a ZILOG Z83C9320FSC or a ZILOG Z8038220FSC. An infrared communications means 502 can be implemented with an infrared remote control receiver module, such as a LITEON LT1033, and an infrared light emitting diode (LED) for transmitting data, such as a LITEON LT1062 LED.

Figure 5B:
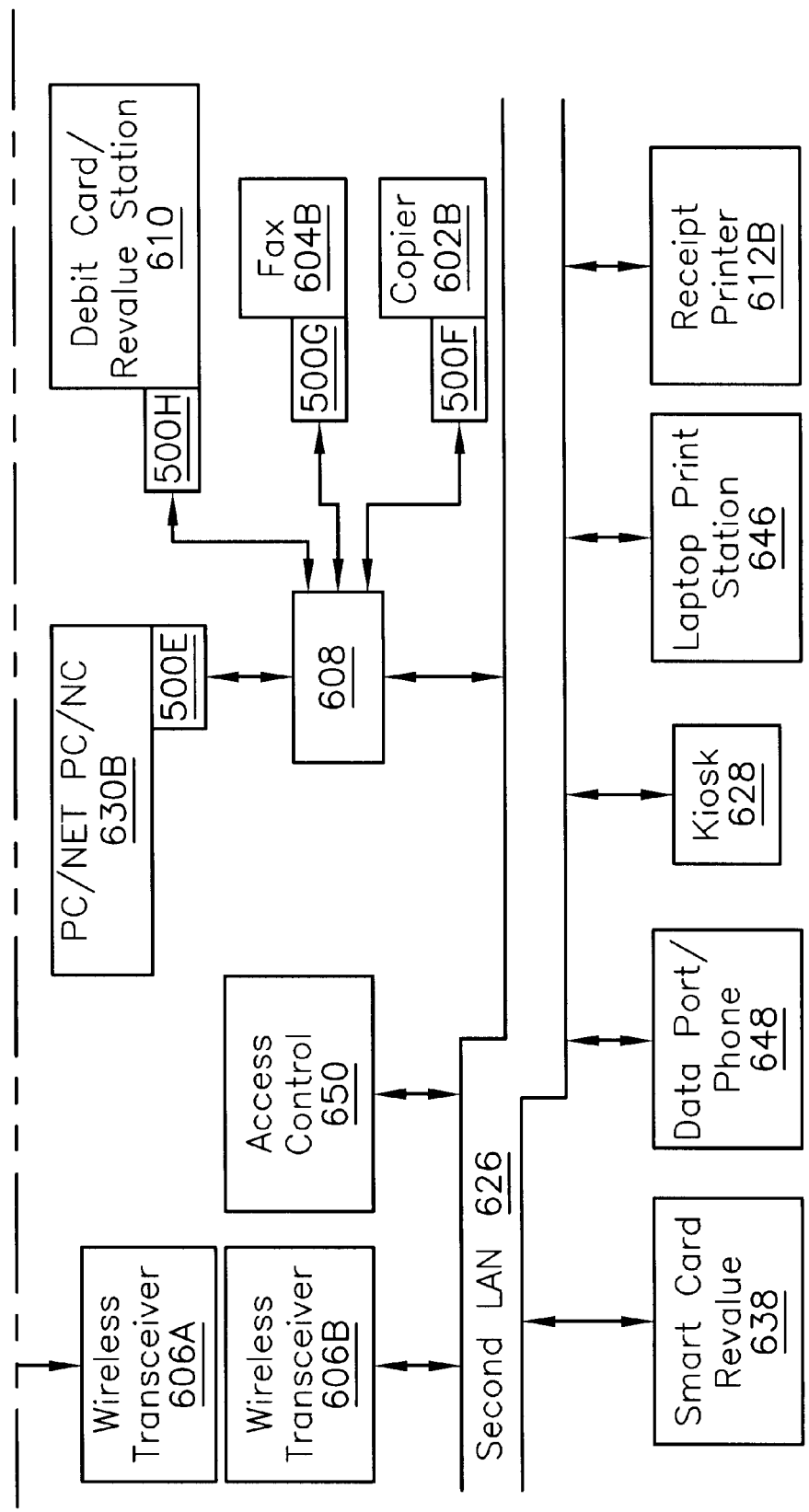
FIG. 5 shows a network 600 block diagram.

FIG. 5 shows a network 600, implementing a plurality of systems 500 together with a PC 630, a server 632, a PMS/MIS 620 and a POS system 614. In an exemplary embodiment, a hand-held device, such as a palmtop computer, by way of infrared communications means 502 can access the network and all systems 500 connected to the network. Furthermore, a hand-held device by way of infrared communications means 502 can data communicate with a server 632 and/or a POS system 614 and/or PMS/MIS system 620 and/or a PC 630. In addition, a hand-held device can data communicate by way of infrared communications means 502 with any vending equipment attached to a first local area network (LAN) 622 and/or a second local area network (LAN) 626 by way of a LAN connection means 556.

In an exemplary embodiment, the use of a LAN can provide necessary network functionality. It is understood by one skilled in the art of network design that other acceptable network architectures could be employed to produce satisfactory results. For example, a wide area network (WAN) could be substituted, or used in combination with a LAN. For purposes of this disclosure all network architecture schemes will be generally referred to as a local area network (LAN).

In an exemplary embodiment, a service technician with a hand held device could record system readings and program functionality of any system 500 controller and/or a network server. By using a hand-held device to data communicate with infrared communications means 502, a technician can upload or download data including program code, service data, transaction data, and other operational data.

Interconnected with microcontroller 532 is a light emitting diode (LED) indicator means 504, whereby multicolored LED's can be utilized to indicate to a user the "status," "state," or "process step" of a routine or function. An example of a "status" function for LED indicator means 504, can be the "on-line" or "off-line" status of a printer attached to the printer interface 530. An example of a "state" indication, by way of LED indicator means 504, can be a "out-of-order" indicator LED illuminating when equipment or the system 500 is "out-of-service." An example of a "process step" function by way of LED indicator means 504, can be a first step indicator illuminating to indicate a "request for authorization", a second step indicator illuminating to indicate an "approved authorization—preparing equipment for use", and a third step indicator illuminating to indicate the "equipment is ready for use." An LED indicator means 504 can be implemented by way of a plurality of PANASONIC LN21RPHL (red LED), LN31GPHL (green LED), and LN41YPHL (amber LED) LED's.

Interconnected with microcontroller 532 is an equipment control means 506. The equipment control means 506 enables and disables the vending equipment for use responsive to customer identification "authorization" by way of a smart card, debit card, credit card, or other input identification means. An equipment control means 506 can be implemented with at least one relay, such as an OMRON relay #G2V-1-DC5, and/or at least one opto-isolator, such as QUALITY TECH #AM400QT.

In an exemplary embodiment, a vending machine such as a printer 104, PC 630, a projector (not shown), fax machine 604A or copier 602A can be controlled by way of equipment control means 506. Such control can be effectuated by activating and deactivating a switching device (a switching device can be an integrated part of the equipment control means 506), such as relay, or a transistor, or other control circuit operationally responsive to microcontroller 532. Control of a vending machine can be facilitated by way of a switching device in a first state activating a circuit or setting a first state within the vending machine allowing the vending machine to function normally. Furthermore, the vending machine can be deactivated for use, by way of a switching device, in a second state, breaking a circuit or setting a second state within the vending machine, disabling the vending machine's functionality.

Interconnected with microcontroller 532 is a vend counter/timer means 508. The vend counter/timer means 508 independently counts and/or times events that occur external to system 500. Microcontroller 532 by way of the vend counter/timer means 508 can program functionally of the vend counter/timer means 508. Furthermore, vend counter/timer means 508 can monitor the status of a vend cycles, counts of vending events, and frequency of cycles wherein a rate, or rate change over a time period if required. Additionally, counter/timer means 508 can monitor time intervals, where vending price may depend on the length of time, a function, feature or vending machine is in use by a customer. A vend counter/time means 508 can be implemented with a ZILOG #Z80-CTC, and or a QUALITY TECH #MID400QT opto-isolator.

Interconnected with microcontroller 532 is a keyboard and mouse control means 510. In an exemplary embodiment, a keyboard/mouse control means 510 can be implemented with clamping voltages (for PC keyboard and PS2 style mouse) and monopolar transmission voltages (for serial style mouse).

Interconnected with microcontroller 532 is a printer/modem control means 512. In an exemplary embodiment, a printer/modem control 512 enables and disables usage of a printer and modem, responsive to control signals from microcontroller 532. The PC by way of system 500 can share the printer with the system 500, such that both the PC and system 500 can print to the printer. The PC by way of system 500 can share the modem with system 500, such that both the PC and system 500 can use the modem for remote data communications.

Interconnected with microcontroller 532 is a telephone interface control means 514. In an exemplary embodiment system.500by way of telephone interface control means 514 enables and disables the usage of a telecommunication line. A telephone interface control means 514 can be implemented as previously disclosed as telecommunication control means 312. Furthermore, telephone interface control means 514 can include a SILICON SYSTEMS 75T202-IP DTMF decoder, whereby microcontroller 532 by way of telephone interface control means 514, detects the telephone number being dialed by a vending machine, such as a fax, PC 630, data-port phone 648, or smart card re-value station 638.

Interconnected with microcontroller 532 is an electrically erasable read only memory ("EEROM") 516. Such an EEROM 516 can be a MICROCHIP 93LC66 serial EEROM. Interconnected with microcontroller 532 is a non-volatile memory 518. Such a non-volatile memory 518 can be a DALLAS SEMICONDUCTOR DS1643-120. Furthermore, the DS1643-120 can provide a non-volatile date and time function whereby microcontroller 532 can be responsive to events based on date and time and date and time tamp transactions as they occur.

Interconnected with microcontroller 532 is a microcontroller monitor 520. Such a microcontroller monitor 520 can be a DALLAS SEMICONDUCTOR DS1232. Microcontroller monitor 520 provides a power-on reset signal to microcontroller 532. A reset signal can be applied to microcontroller 532 when the power supply voltage applied to the microcontroller monitor 520 falls outside a specific range of voltage (preset within the microcontroller monitor 520). A reset signal can also be applied to microcontroller 532, should microcontroller 532 fail to provide a reset signal to a watchdog clock time-out counter within microcontroller monitor 520.

Interconnected with microcontroller 532 is a hardware security interface means 522. Hardware security interface means 522 includes a closed loop interface. A loop of wire can be woven through a series of devices such as a keyboard 110, mouse 112, monitor 128 is and PC 630. An "alarm condition" results if the wire loop is electrically broken. Further, hardware security interface means 522 includes a plurality of tilt sensors, wherein tilt or motion sensors can be placed on a plurality of vending equipment and peripherals. An alarm signal is resultant if the tilt sensors are activated (excessive tilting occurs). Furthermore, an "alarm condition" service request can be data communicated by way of the LAN network connection means 556 to any destination location, remote or on the network. Alarm destination locations can include a front desk, security office, owner of the retail store, police or other vending device such as a server 632, a POS system 614, a PMS/MIS system 620 or a PC 630. A hardware security interface means can be implemented with CAROL hook-up wire type C2064. ANAMET INDUSTRIAL, INC. strip wound hose type stainless steel UI (armored cable) can be used to enclose and protect the security wire loop. Tilt can be measured be a COMUS INTERNATIONAL #CA20-0 or a FIFTH DIMENSION #TS7-0 mercury switch.

Interconnected with microcontroller 532 is an alarm means 524. An alarm means 524 can be implemented using a PANASONIC piezoelectric ceramic buzzer #EFB-RL37C22. In an exemplary embodiment, a single enclosure fastened to a vending machine can contain a system 500, a hardware security interface means 522 (including motion and/or tilt sensors), and an alarm means 524. Motion of the vending machine imparts motion of fastened system 500 causing a tilting "alarm condition." Alternatively, an enclosure not fastened to a vending machine containing a system 500, hardware security interface means 522, and alarm means 524 can have motion and/or tilt sensors fastened to a vending machine external to the system 500 enclosure interconnected as required for desirable operability.

Interconnected with microcontroller 532 are relay switches 526. Relay switches 526 can be utilized for general-purpose load and signal switching being responsive to control signals from microcontroller 532. A general-purpose relay switch 526 can be implemented by way of an OMRON G5V-1-DC5 or an OMRON G3B-1174P-US-DC5 (for high current loads).

Interconnected with microcontroller 532 is a solenoid control means 528. Solenoid control means 528 is responsive to control signals from microcontroller 532 and can effectuate driving of a solenoid. In an exemplary embodiment, the solenoid control means 528 is responsive to a system 500 detecting an "out-of-supply" condition of a vending machine and opening a supply door/drawer to allow a customer to restock the vending machines. Supplies can include paper, ink and toner for a copier, printer, fax, or PC. In another exemplary embodiment, the solenoid control means 528 can lock and unlock the business center furniture, such as table 129, when circumstances require. In another exemplary embodiment, a solenoid control means 528 can lock and unlock a retail store location essentially granting access to a 24-hour area of the store. A solenoid control means 528 can be implemented by way of a QUALITY TECH triac output opto-isolator #MOC3010QT and or a QUALITY TECH gated triac Q2015L5, and/or a GUARDIAN solenoid.

Interconnected with microcontroller 532 is an auxiliary terminal interface control means 530 for interfacing with a transaction control device 108.

Interconnected with microcontroller 532 is a plurality of input devices including a voice and/or handwriting capture and recognition means 534, a bar code reader 536, a fingerprint/palm/hand reader biometric means 538, and a keypad 540. Each of these input devices performs the indicated function independent of microcontroller 532 and by way of data communications with microcontroller 532 data communicates results of the input function to microcontroller 532 for interpretative post processing. Handwriting capture and analysis processing allows a system 500 to capture a customer's signature. Operating on the captured signature an analysis or customer validating process can be performed. Furthermore, the captured signatures can be utilized for authorization of the transaction and for credit card processing purposes.

Interconnected with microcontroller 532 is a personal computer memory card industry association (PCMCIA) interface 542. Industry standard PCMCIA compliant devices can be plugged into the PCMCIA interface 542 and data communicate with microcontroller 532. In an exemplary embodiment, a hand-held device, notebook computer, laptop/palmtop computer, modem or other data communication means or other data processing equipment (generally referred to as other data processing equipment) can by way of PCMCIA interface 542 access network 600. Access to the network can selectively include other systems 500, vending machines, servers, VSAT communications, or any other device or communication means connected to the network 600. Furthermore, other data processing equipment by way of PCMCIA interface 542, can data communicate with a server 632, POS system 614, PMS/MIS system 620, or PC 630. Other data processing equipment can data communicate by way of the PCMCIA interface 542 with any vending machine or other device attached to the first LAN network 622 or the second LAN network 626 by way of a system 500 interconnected with said vending machine.

As an example, a service technician desiring to record network system readings or program functionality of a system 500 controller or network server (referred to as a "universal server") can do so by way of PCMCIA interface 542. With a hand-held device, notebook computer, laptop computer, palmtop computer, or other data processing device interconnected to the PCMCIA interface 542 the technician can upload or download data including program code, service data, and other operational data.

The term "universal server" is defined as a server, network server or data processing device capable of supporting data communication with other data processing devices. Further, a universal server can be a PC 630, PMS/MIS or POS system, or other dedicated computing device. A system 500 can be a universal server. A universal server can reside on a network 600 locally or remotely. There can be more than one universal server on a network 600. In addition, a single universal server can monitor and control numerous different (related or unrelated) networks 600. In this fashion, a single universal server or multiple universal servers can monitor an unlimited number of networks 600 worldwide. Processing and data communications can occur between different networks 600 that have a universal server in common. Processing and data communication between more than one universal server can occur. Additionally, data communication between more than one independent network 600 can occur by way of a plurality of universal servers data communicating with each other. A universal server can have data connection means to the Internet, be an Internet based, server (a web server) or be an Internet based data storage or processing device.

Interconnected with microcontroller 532 is a modem 544. Modem 544 can be used to data communicate with remote locations, such as a credit bureau, other service processing centers, other servers, or other data communicating devices (including other systems 500). A modem 544 can be a CERMETEK CH1786LC modem.

Interconnected with microcontroller 532 is a plurality of card and key readers and writers including smart card reader/writer 548, magnetic card reader/writer 550, debit card reader/writer 552 and a hotel room key/card interface 554. Each interface accepts a form of customer identification and data communicates with microcontroller 532. A smart card reader/writer 548 can be a GEMPLUS GCR400, or a GEMPLUS GCI400, or a NEURON MSR-100, or a NEURON MSR-270 series. A magnetic card reader/writer 550 can be a XICO 7102ESA, or a XICO 6272SA, or a NEURON MSR-100, or a NEURON MSR-270 series, or a NEURON MCX-370-1R-0101. A debit card reader/writer 552 can be a DEBITEK, DAYNL, SCHLUMMERGE, ACT, XCP, ITC, COPICARD brand of debit card reader/writer, or other transaction control device 108.

Interconnected with microcontroller 532 is a local area network (LAN) network control means 556. A LAN network connection means 556 includes a wireless communication means 558, a carrier current communication means 560 and a hardwired communication means 562. A wireless transceiver means 558 can be a WIRELESS TRANSACTION CORPORATION WCC-1200, WTC-1300, STU-200, or a STU-300. A carrier current communication means 560 can be effectuated with traditional carrier current technologies, or spread spectrum technologies. Such a communication means 560 can be implemented as desired and known to one skilled in the art. A hardwired transceiver control means 562 can be implemented by way of the RS232 standard serial communication, or RS485 serial communication. RS485 data communication can be effectuated with a pair of wires (DATA "A" wire and DATA "B" wire). Further, a hardwired communication means 562 can be implemented using Ethernet, token ring, TCP/IP, Net Buoy or other networking scheme as is known to one skilled in the, art.

In an exemplary embodiment the LAN network connection means 556 allows vending equipment to be located in permanent or temporary "stationary locations," "in-room locations" and on "mobile carts." A mobile cart PC 630, copier 602A or fax 604A can be located pool side, in a recreation area, or in a hotel room and remain connected to the LAN network by way of LAN connection means 556, wireless communication means 558, carrier current communication means 560, or hardwired communication means 562.

Interconnected are a first communication means 564 and a second communication means 566. The first and second communication means 564 and 566 can be PARALLEL, RS232, RS485, PCMCIA, LAN or other standard communication ports. Interconnection to peripheral devices can include printers, network controllers, hand-held devices, and PC's 630. A first and second communication means 564 and 566 can be implemented with a SIPEX SP235A (RS232—TTL converter), and/or a MAXIM MAX481 (RS485 converter).

Interconnected with microcontroller 532 is a parallel interface 568. By way of parallel interface 568, microcontroller 532 can data communicate bi-directionally with other data devices. Parallel interface 568 can support standard parallel communication formats including ECC and ECP formats. Networking with other PC's 630 can also be effectuated by way of parallel interface 568.

Interconnected with microcontroller 532 are voice record and playback means 570. An interconnection exists between the voice recorder and playback means 570 and a microphone 572. A further interconnection exists between the voice recorder and playback means 570 and a speaker 574. Data communication to system 500 by way of LAN network connection means 556 can include bidirectional voice and video data communications. Microcontroller 532, voice record and playback means 570, microphone 572, speaker 574, camera 578, and, optionally, other elements of system 500 can be combined for an interactive user response system. The interactive user response system allows users of the system to effectively communicate data, voice, audio, and video over the systems and network described herein.

In an exemplary embodiment, an intercom system can be operationally established between a plurality of systems 500 and a PC 630, server 632, POS system 614, PMS/MIS system 620, or other central location (like the front desk in a hotel, security office, etc.). Voice record and playback means 570 including a microphone 572 and a speaker 574 can be implemented with an OKI SEMICONDUCTOR MSM9841 or a OKI SEMICONDUCTOR MSM6585RS, a PANASONIC #WM-034BY electric condenser microphone cartridge, and a PANASONIC. #EAS-3P128A micro speaker.

In an exemplary embodiment, a customer/user can respond to an advertisement displayed on the first or second display means 580 or 582. By way of LAN network connection means 556 a customer can be connected with a sales organization, a help desk, or an information center. (in general an ORGANIZATION). By interactively communicating with the organization by way of microphone 572, speaker 574, camera 578 and the first or second display means 580 and 582, a customer can obtain product, service, or other information. Should a customer decide to buy, or should a payment or identification (ID) be necessary, a customer can present appropriate ID at smart card reader/writer 548, magnetic card reader/writer 550, debit card reader/writer 552, room key/card interface 554 or any other appropriate input to system 500. Appropriate identification means can include ID, credit card, smart card, cash, coin, debit card, or biometric input. In an exemplary embodiment, goods and services can be purchased, and electronic commerce effectuated between a user, a system 500, and a location, site, and organization (local or remote).

Interconnected with microcontroller 532 is a first display. 582. First display 582 can be a liquid crystal display (LCD), wherein transaction information and advertising can be displayed. A first display 582 can be implemented by way of an OPTREX #DMF-5002NY-EB super-twist graphics module, or an OPTREX #DMC-6204NY-LY liquid crystal display, or a OPTREX #DMF-50944NCU-FW-1 and an EPSON SED1354FOA LCD controller.

Interconnected with microcontroller 532 is a video record and playback means 576. An interconnection exists between video record and playback means 576 and a camera 578. A further interconnection exists between the video processing and playback means 576 and a first display means 582 and a second display means 580. In an exemplary embodiment, a video intercom system can be operationally established between a plurality of systems 500 and a PC 630, server 632, POS system 614, PMS/MIS system 620, or other central location (like the front desk in a hotel, security office, etc.). Video record and playback means 576 including camera 578, a first display means 582, and a second display means 580 can be implemented with a PANASONIC #BS7259L black and white CCD camera, a cathode ray tube (CRT) monitor, a OPTREX #DMF-5002NY-EB super-twist graphics module, and/or an OPTREX #DMC-6204NY-LY liquid crystal display, or a OPTREX #DMF-50944NCU-FW-1 and an EPSON SED1354FOA LCD controller.

In an exemplary embodiment, a plurality of systems 500 can be connected to a plurality of vending machines. Furthermore, a plurality of systems 500 can be networked together with a PC 630, a server 632, a PMS/MIS 620, or a POS system 614. There is shown in FIG. 5, a network schematic 600, referred to as network 600, implementing a plurality of systems 500 networked together with a PC 630, a server 632, a PMS/MIS system 620, and a POS system 614. Any number of vending machines and vending machine types can be controlled by way of a plurality of systems 500. Any number of servers, POS systems, PMS/MIS systems, and remote locations can be controlled by way of network 600.

In an exemplary embodiment, a plurality of systems 500 independently data communicate with a server 632, a POS system 614, a PMS/MIS system 620, or a PC 630. As previously disclosed a server 632, a POS system 614, a PMS/MIS system 620, and a PC 630 that gives remote access to any of these types of devices including Internet access by way of a PC 630 or VSAT connection, will be generically referred to as a universal server. A universal server can also be a system 500.

Interconnected with a copier 602A can be a system 500B. A system 500B can be a system 500. Further, interconnected with a copier 602B can be a system 500F. A system 500F can be a system 500. A further interconnection exists between system 500B and the first LAN 622. A further interconnection exists between system 500F and the second LAN 626 by way of a concentrator 608. A further interconnection exists between the concentrator 608 and the second LAN 626.

Concentrator 608 can be a system 500, whereby a plurality of systems 500 can interconnect with a single concentrator 608. Implementing a concentrator 608 allows fewer direct system 500 interconnections to the first LAN 622 or the second LAN 626.

Furthermore, when a plurality of systems 500 are interconnected with a concentrator 608, data communication to any individual system 500 by way of a concentrator 608 is unimpeded. Furthermore, such data communication by way of a concentrator 608 is transparent to the first LAN 622, and/or the second LAN 626, and/or the systems 500, which are interconnected with the concentrator 608.

The first LAN 622 and the second LAN 626 can be the same LAN, and/or alternatively different LANs. Furthermore, when the first LAN 622, the second LAN 626, and any other LAN are to be interconnected, to become the same LAN, an interconnection between a plurality of separate LANs can be perfected by way of at least two wireless transceivers 603A and 603B. In an exemplary embodiment, a type of wireless transceivers 603A and 603B can be radio frequency RF type, spread spectrum type, carrier current type, and/or other wired or wireless data communication type methodologies.

Interconnected with a fax machine 604A can be a system 500C. A system 500C can be a system 500. Interconnected with a fax machine 604B can be a system 500G. A system 500G can be a system 500. A further interconnection exists between system 500C and the first LAN 622. A further interconnection exists between system 500G and the second LAN 626 by way of a concentrator 608.

Interconnected with the fax machine 604A, by way of the system 500C, is a remote location 636. Alternatively, fax machine 604A can interconnect and data communicate with remote location 636 without the need of a system 500C. Remote location 636 can be an online service, Internet site, credit bureau, database, service center, or other remote location. Remote location 636 can be located on-site in relative geographic proximity to fax machine 604A or off-site geographically located anywhere in the world. Furthermore, the fax machine 604A can data communicate with remote location 636 by way of standard network protocols, by way of an Internet type connection, modem, ISDN, ADSL, VSAT satellite communication, dedicated hardware connection, TCP/IP, other network means, or other wired or wireless communication means. Furthermore, remote location 636 can simultaneously manage data communications between any number of networks 600 and remote location 636. Data communications can also be facilitated between different networks 600 geographically located anywhere in the world by way of two or more networks 600 having in common shared data communication resources with a remote location 636.

Interconnected with a PC 630A can be a system 500A. A system 500A can be a system 500. Interconnected with a PC 630B can be a system 500E. A system 500E can be a system 500. A further interconnection exists between system 500A and the first LAN 622. A further interconnection exists between system 500E and the second LAN 626 by way of a concentrator 608.

Interconnected with the PC 630A is a remote location 606. Remote location 606 can be an online service, Internet site, credit bureau, database, service center, or other remote location. Remote location 606 can be located on-site in relative geographic proximity to PC 630A or off-site geographically located anywhere in the world. Furthermore, the PC 630A can data communicate with remote location 606 by way of standard network protocols, by way of an Internet type connection, modem, ISDN, ADSL, VSAT satellite communication, cable modem, T1 telecommunication line, dedicated hardware connection, TCP/IP, other network means, or other wired or wireless communication means.

Additionally, remote location 606 can simultaneously manage data communications between any number of networks 600 and remote location 606. Data communications can also be facilitated between different networks 600 geographically located anywhere in the world by way of two or more networks 600 having in common shared data communication resources with a remote location 606.

Interconnected with a debit card/re-value station 610 can be a system 500H. A system 500H can be a system 500. A further interconnection exists between system 500H and the second LAN 626, by way of the concentrator 608. The debit card/re-value station 610 can be in the form of a customer service kiosk, or a general service kiosk.

In an exemplary embodiment, a customer can purchase, and/or re-value/transfer value or otherwise re-value and/or obtain a valid "ready-to-use" form of ID (to activate a system 500). For example, a customer can present credit card, cash, coin, or other currency means and obtain a debit card, smart card or other ID form. Access to products and services from the vending machines controlled by way of network 600 can then be obtained with the valid form of ID. A customer can also present a credit card, cash, coin, or other currency means and transfer value/credit/cash to a smart card, or other form of ID. A customer can also present a valid ID to purchase business supplies. Business supplies available from the debit card/re-value station 610 can include postage stamps, staplers, paper clips, paper supplies, writing utensils, binding and presentation materials, and other business related products.

Interconnected with a printer 69A is the first local area network (LAN) 622. The printer 69A can be a system 500 in combination with a printer, or print mechanism. In an exemplary embodiment, a printer 69A can be a general-purpose printer for use by a customer, and/or any system 500 device on network 600. Any vending machine or universal server on the first LAN 622 or the second local area network (LAN) 626 can also access and data communicate with the printer 69A. Applications for the printer 69A can include general-purpose printing, transaction receipt printing, hotel/retail outlet summary report printing, advertisement printing, coupon printing, computer/notebook/laptop/palmtop printing, and hotel/retail outlet activity report printing.

Interconnected with a printer 69B is the second LAN 626. The printer 69B can be a system 500 in combination with a printer. In an exemplary embodiment, a printer 69B can be a general-purpose printer for use by a customer, and/or any system 500 on network 600. Furthermore, any vending machine or universal server on the first LAN 622, or the second LAN 626 can utilize printer 69B. Applications for the printer 69B can include general purpose printing, transaction receipt printing, hotel/retail outlet summary report printing, advertisement printing, coupon printing, computer/notebook/laptop/palmtop printing, and hotel/retail outlet activity report printing.

The printer 69A and the printer 69B are independently accessible, programmable and network functional. Furthermore, any number of printers 69A, or 69B can be interconnected on network 600, each of said printers 69A, 69B being independently accessible, programmable and network functional. In an exemplary embodiment, sufficient quantities of printer 69A, or 69B can be interconnected with the network 600 to best serve customer convenience.

Interconnected with a pre-paid telephone card vending (re-value and/or dispense) machine 624 can be a system 500J. A system 500J can be a system 500. A further interconnection exists between the system 500J and the first LAN 622. In an exemplary embodiment, the pre-paid telephone card vending machine 624 can effectuate the dispensing and re-valuing of pre-paid telephone cards. In addition to the pre-paid telephone card's intended use of operating a telephone, the pre-paid telephone card can also be utilized as an ID form to access, by way of a system 500, vending equipment interconnected with a system 500 and network 600.

Interconnected with vending machine 640 that dispenses goods, services, food, or beverage can be a system 500K. A system 500K can be a system 500. A further interconnection exists between the system 500K and the first LAN 622. In an exemplary embodiment, the food and beverage vending machine 640 can effectuate the dispensing of goods and services, food and beverage products.

Interconnected with an information/Internet kiosk 628 is the second LAN 626. The information/Internet kiosk 628 can include a system 500 in combination with a PC 630 or other computer data communication equipment. In an exemplary embodiment, the information/Internet kiosk and a system 500 interconnected in combination with the information/Internet kiosk 628 can effectuate electronic commerce transactions (payment, shipping, ordering, etc.). Additionally, such a system can provide access to and can effectuate transactions for products and services including other on-line, and/or off-line transactions (i.e. travel information, coupons, advertising, general use, entertainment, business, etc.).

Interconnected with a PMS/MIS system 620 can be a system 500D. A system 500D can be a system 500. A further interconnection exists between the system 500D and the first LAN 622. In an exemplary embodiment, the PMS/MIS system 620 can allow centralized programming and control of the network 600. The PMS/MIS system 620 can manage data processing needs of the network 600, can store and allow modification of vending machine settings, and implement gathering and maintain marketing, customer survey and other informational databases. Furthermore, PMS/MIS system 620 can support transaction processing, and/or implement the universal server functionality.

Interconnected with the management information system 620 is a remote location 618. Remote location 618 can be an online service, Internet site, credit bureau, database, service center, or other remote location. Remote location 618 can be located on-site in relative geographic proximity to management information system 620 or off-site geographically located anywhere in the world. Further, The management information system 620 can data communicate with remote location 618 by way of standard network protocols, by way of an Internet type connection, modem, ISDN, ADSL, VSAT satellite communication, cable modem, T1 telecommunication line, dedicated hardware connection, TCP/IP, other network means, or other wired or wireless communication means. Furthermore, remote location 618 can simultaneously manage data communications between any number of networks 600 and remote location 618. Additionally, data communications can be facilitated between different networks 600 geographically located anywhere in the world by way of two or more network 600 having in common shared data communication resources with a remote location 618.

Interconnected with a point of sale (POS) system 614 can be a system 500I. A system 500I can be a system 500. A further interconnection exists between the system 500I and the first LAN 622. In an exemplary embodiment, the POS system 614 can allow centralized programming control of the network 600, while managing and retaining all current in-store programming and functionally. The POS system 614 can manage data processing needs of the network 600, can store and allow modifications of vending machine settings, and can implement gathering and maintain marketing, customer survey and other informational databases. Further, POS system 614 can support transaction processing, and/or implement the universal server functionality.

Interconnected with the POS system 614 is a remote location 616. Remote location 616 can be an online service, Internet site, credit bureau, database, service center, or other remote location. Remote location 616 can be located on-site in relative geographic proximity to the POS system 614 or off-site geographically located anywhere in the world. Further, the POS system 614 can data communicate with remote location 616 by way of standard network protocols, by way of an Internet type connection, modem, ISDN, ADSL, VSAT satellite communication, cable modem, T1 telecommunication line, dedicated hardware connection, TCP/IP, or other network means, or other wired or wireless communication means. Additionally, remote location 616 can simultaneously manage data communications between any number of networks 600 and remote location 616. Data communications can also be facilitated between different networks 600 geographically located anywhere in the world by way of two or more networks 600 having in common shared data communication resources with a remote location 616.

Interconnected with a server 632 is the first LAN 622. A server 632 can be a system 500. In an exemplary embodiment, the server 632 can allow centralized programming control of the network 600, while managing and retaining all current in-store programming and functionally. The server 632 can manage data processing needs of the network 600, can store and allow modifications of vending machine settings, and can implement gathering and maintain marketing, customer survey and other informational databases. Also, server 632 can support transaction processing, and/or implement the universal server functionality.

Interconnected with a smart card re-value station 638 is the second LAN 626. A smart card re-value station can be a system 500. The smart card re-value station 638 can accept a valid form of ID, and/or currency. Furthermore, the smart card re-value station 638 can data communicate by way of the auxiliary terminal control means 530, to a smart card. Additionally, by way of the universal server and/or the dynamic identification interchange (DII) the smart card re-value station 638 can add or subtract value (monetary/credit/units) from a smart card. (The dynamic identification interchange is further disclosed in FIG. 11 in the transaction routing routine 900, block 908.) The smart card re-value station 638 can also display the available amount of value (monetary/credit/units) available and currently stored on, or accessible by the smart card. A user can also select an amount to operate on (credit/debit) by way of a keypad 540. Additionally, a user can select the amount to add, subtract, or transfer from the smart card and from other banking, credit accounts, or other databases by way of smart card re-value station 638 preprogramming, universal server settings, or other input means. In an exemplary embodiment, the smart card re-value station 638 can, by way of the universal server and/or the DII transfer funds to and from, or between account(s), bank account(s), credit bureau(s), or other databases. The accounts or databases can be on-site, off-site, and/or accessible by way of remote location 606, 616, 618, 634, 636, or network 600.

Interconnected with the server 632 is a remote location 634. Remote location 634 can be an online service, Internet site, credit bureau, database, service center, or other remote location. Remote location 634 can be located on-site in relative geographic proximity to server 632 or off-site geographically located anywhere in the world. The server 632 can also data communicate with remote location 634 by way of standard network protocols, by way of an Internet type connection, modem, ISDN, ADSL, VSAT satellite communication, cable modem, T1 telecommunication line, dedicated hardware connection, TCP/IP, other network means, or other wired or wireless communication means. Furthermore, remote location 634 can simultaneously manage data communications between any number of networks 600 and remote location 634. Additionally, data communications can be facilitated between different networks 600 geographically located anywhere in the world by way of two or more networks 600 having in common shared data communication resources with a remote location 634.

The remote location 606, remote location 616, remote location 618, remote location 634, and remote location 636 can be the same remote location. Also, remote location 606, remote location 616, remote location 618, remote location 634, and remote location 636 can be data communicated to with similar or dissimilar data communication types or means. Furthermore, remote location 606, remote location 616, remote location 618, remote location 634, and remote location 636 can be different remote locations with different services or different functionality.

Interconnected with access control terminal 650 is the second LAN 626. Access control terminal 650 can be a system 500. In an exemplary embodiment, an access control terminal can be utilized to accept ID and grant access to secured areas. For a retail location that has a 24-hour access area, an access control terminal 650 can be used to allow the general public to present ID to be verified and to enter the secured area. Acceptable forms of identification can include a smart card, or a magnetic card (i.e. credit card, debit card, pre-paid, automated teller machine (ATM) or other bank or private issued card), hotel room key/card or other insertion type identifying devices. Additionally, biometric input such as handwriting, voice, finger, palm, hand, eye (iris scan) identification can also be an acceptable forms of ID.

Figure 6A:
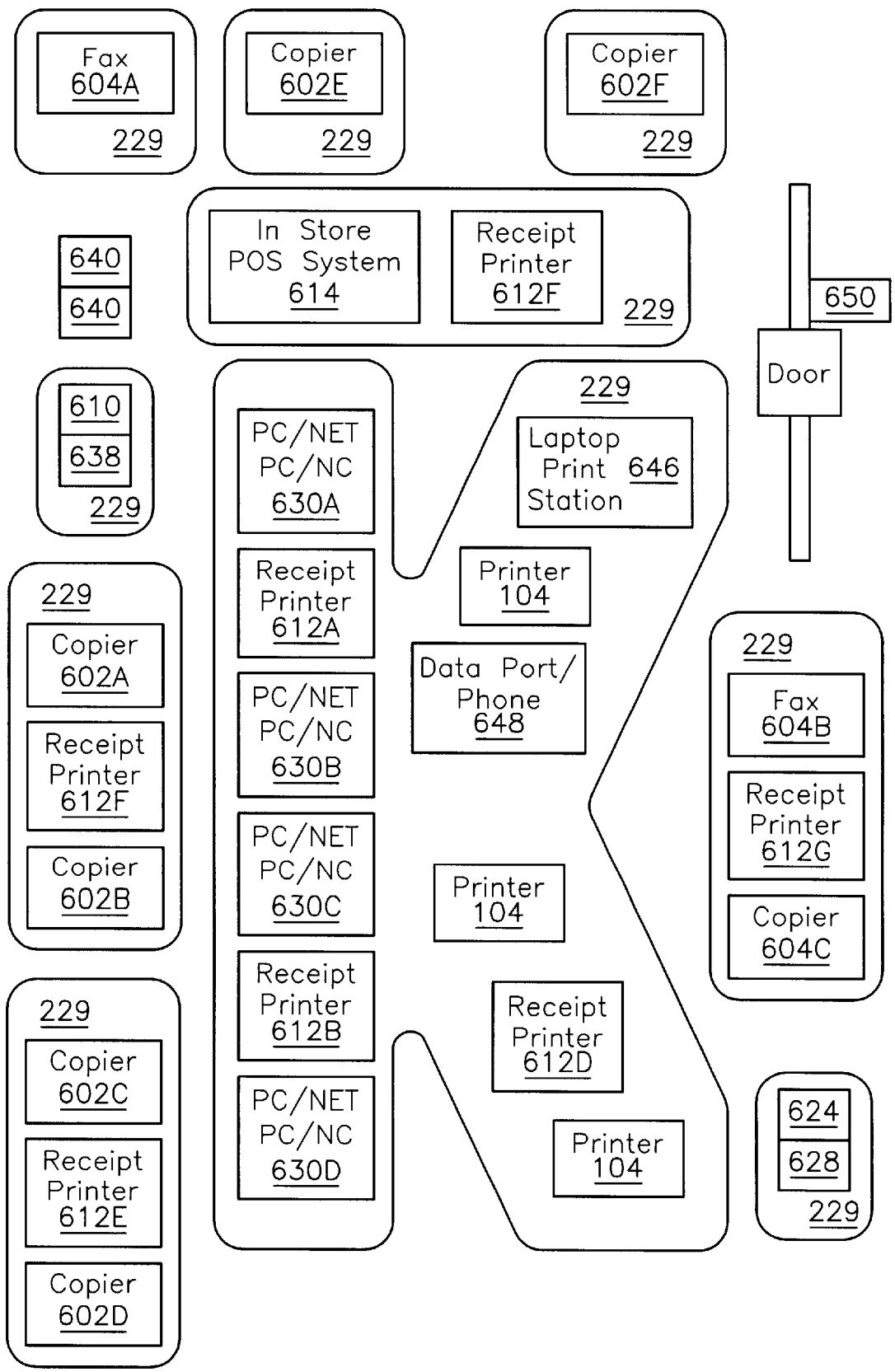
FIGS. 6A–6B shows a retail and hotel system embodiment.
Figure 6B:
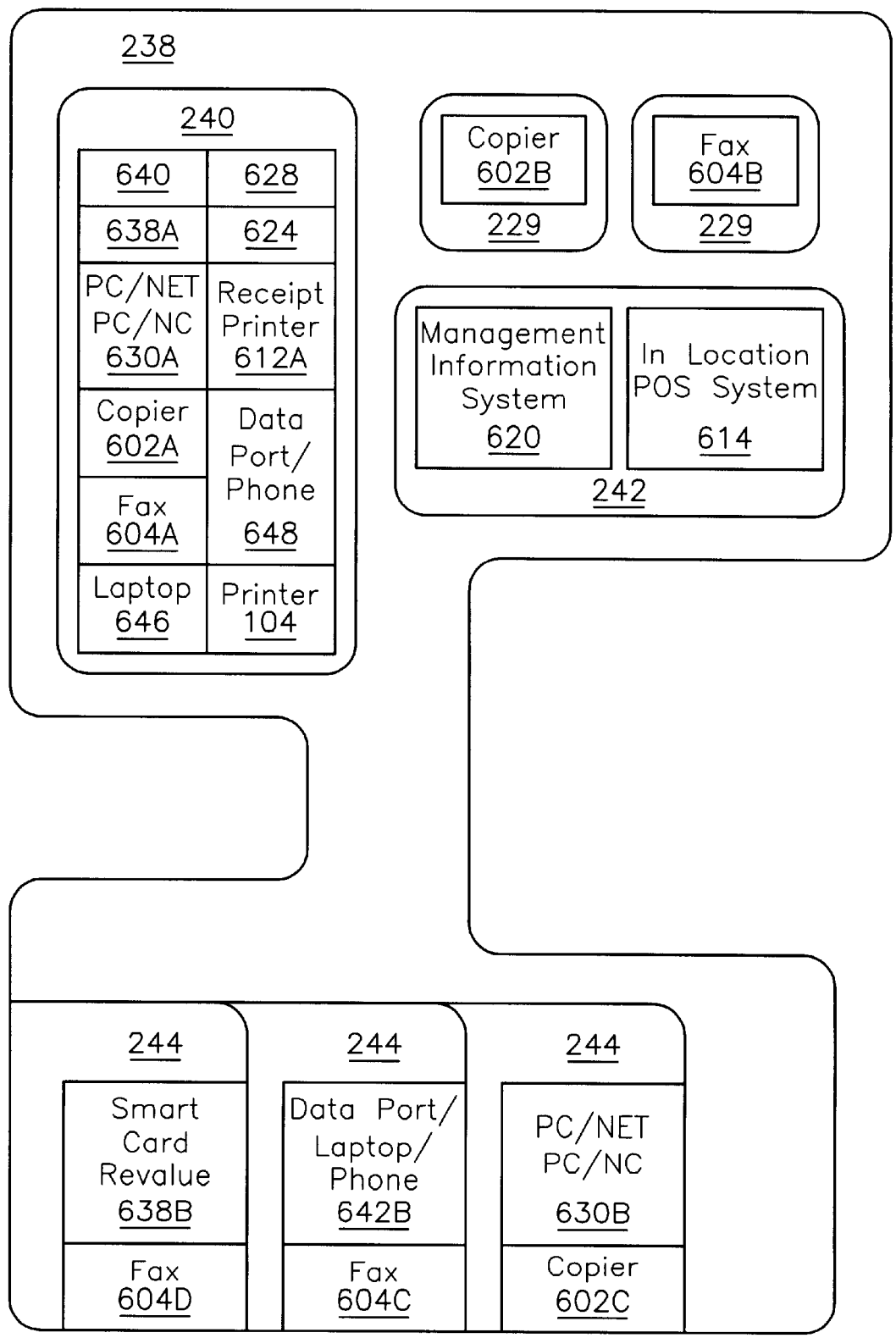

There is shown in FIGS. 6A–6B, a floor plan illustrating how a network 600 with a plurality of vending machines and a plurality of systems 500, could be implemented in a retail location or in a hotel. Referring to FIG. 6A, a representative floor plan of a retail location offering business services 229 is shown. Referring to FIG. 6B, a representative floor plan of a hotel offering business service 238 is shown. Hotel rooms 244 illustrate how business products and services can be made available within a hotel room. Business Center/Lobby Area/Conference room 240 illustrates how business products and services can be made available in dedicated areas of a hotel. Additionally, the front desk area 242 is shown with copier 602B and Fax 604B shown behind the front desk. In an exemplary embodiment, hotel operations copier, faxes, PC's and other vending machines can be connected to a network 600 and all business equipment (public use and private use) can be monitored, controlled and audited.

Figure 7A:
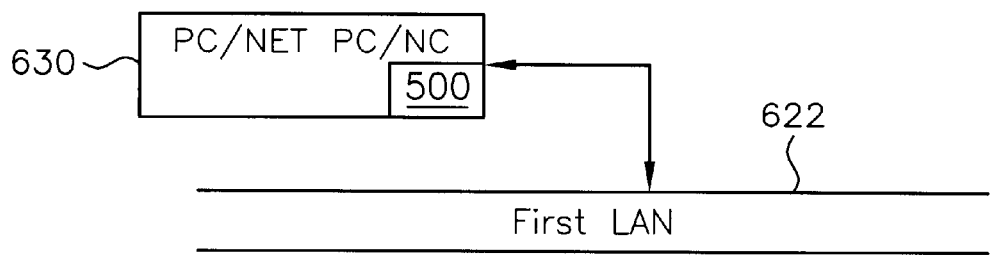
FIGS. 7A–7C shows a system 500, PC/NET PC/NC 630, network 600 interconnection.
Figure 7B:
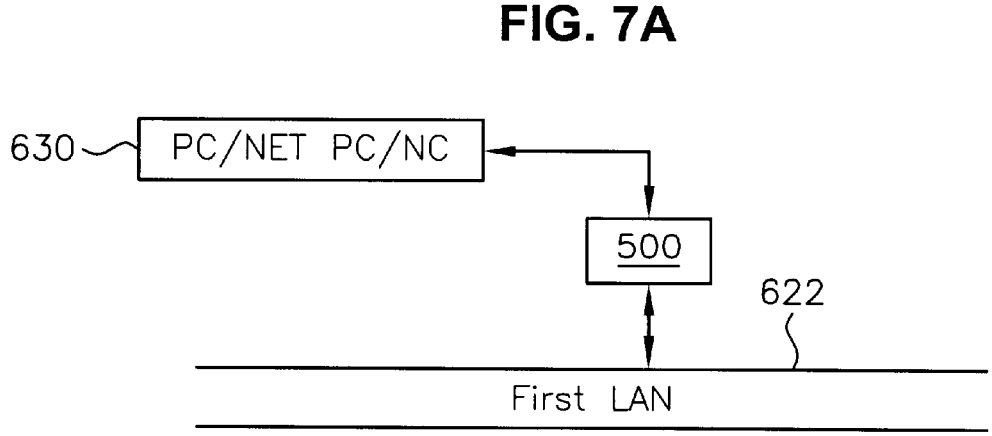
Figure 7C:
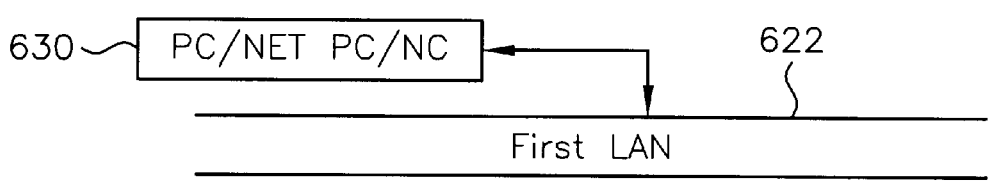

There is shown in FIGS. 7A–7C, a plurality of exemplary embodiment interconnection schemes between a PC 630, a system 500, and a local area network (LAN), such LAN can be the first LAN 622, or the second LAN 626. Referring to FIG. 7A, there is shown a PC 630 with a system 500 built into the PC 630. A further interconnection exists between the system 500 and the LAN, such as first LAN 622 or second LAN 626. PC 630 can be responsive to the system 500, and controllable by the system 500. Furthermore, both the system 500 and the PC 630 (by way of the system 500) can data communicate over the first LAN 622.

Referring to FIG. 7B, there is shown a system 500 external to a PC 630. The system 500 can be mounted to another object or located in another object such as a being integrated into a keyboard, monitor or other device. An interconnection exists between the system 500 and the PC 630. A further interconnection exists between the system 500 and, a LAN, such a LAN can be the first LAN 622 or the second LAN 626. PC 630 can be responsive to the system 500, and controllable by the system 500. Furthermore, both the system 500 and the PC 630 (by way of the system 500) can data communicate over LAN 622.

Referring to FIG. 7C, there is shown a PC 630 interconnected with the LAN. Such a LAN can be the first LAN 622, or the second LAN 626. In this exemplary embodiment, a separate system 500 is not required. In this embodiment, the PC 630 provides the necessary functionality to integrate to the LAN. In this embodiment, functionality of the system 500 resides in software and hardware of the PC 630. As required by the application, the system 500 can be (as required) physically or otherwise integrated in the PC 630. This embodiment is particularly useful in original equipment manufacturing (OEM), wherein it may be desirable to build the system 500 functionality directly in to the PC 630 at the time of manufacturing to minimize the integration work, system testing, and cost of the entire system.

Figure 8:
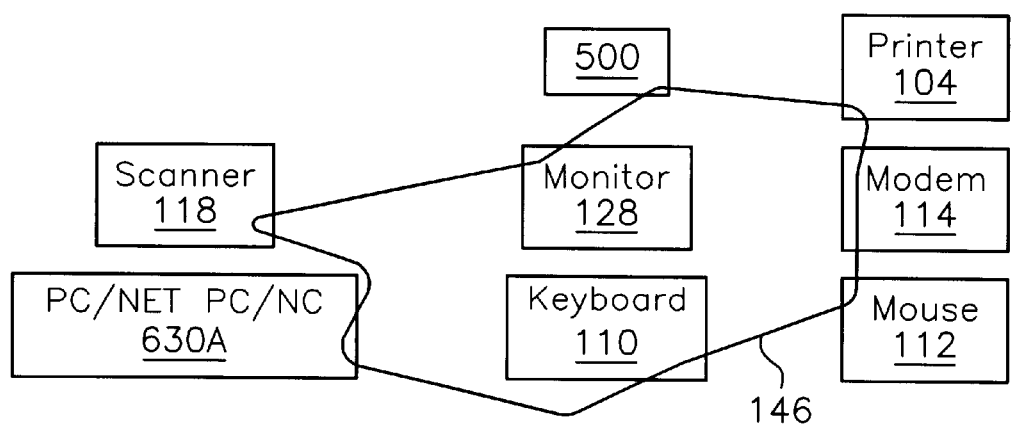
FIG. 8 shows a security configuration

There is shown in FIG. 8, a security configuration implemented by way of a system 500. A system 500 by way of a security interface means 522 and a wire loop 146 is interconnected with a PC 630, scanner 118, keyboard 110, printer 104, modem 114, and a mouse 112.

In an exemplary embodiment, all equipment accessible to the public is interconnected with wire loop 146. Electrical continuity status of wire loop 146 is data communicated to the universal server, and other systems 500. In the event the continuity of wire loop 146 changes, such as wire loop 146 is electrically broken, system 500 can still perform appropriate tasks. Appropriate tasks include sounding alarms, locking access doors, and utilizing network 600 to notify authorities (police, fire, security, front desk, retail store owner), and or data communicating with data communicating devices. Data communicating to devices can include other systems 500, such as access control 650.

Figure 9A:
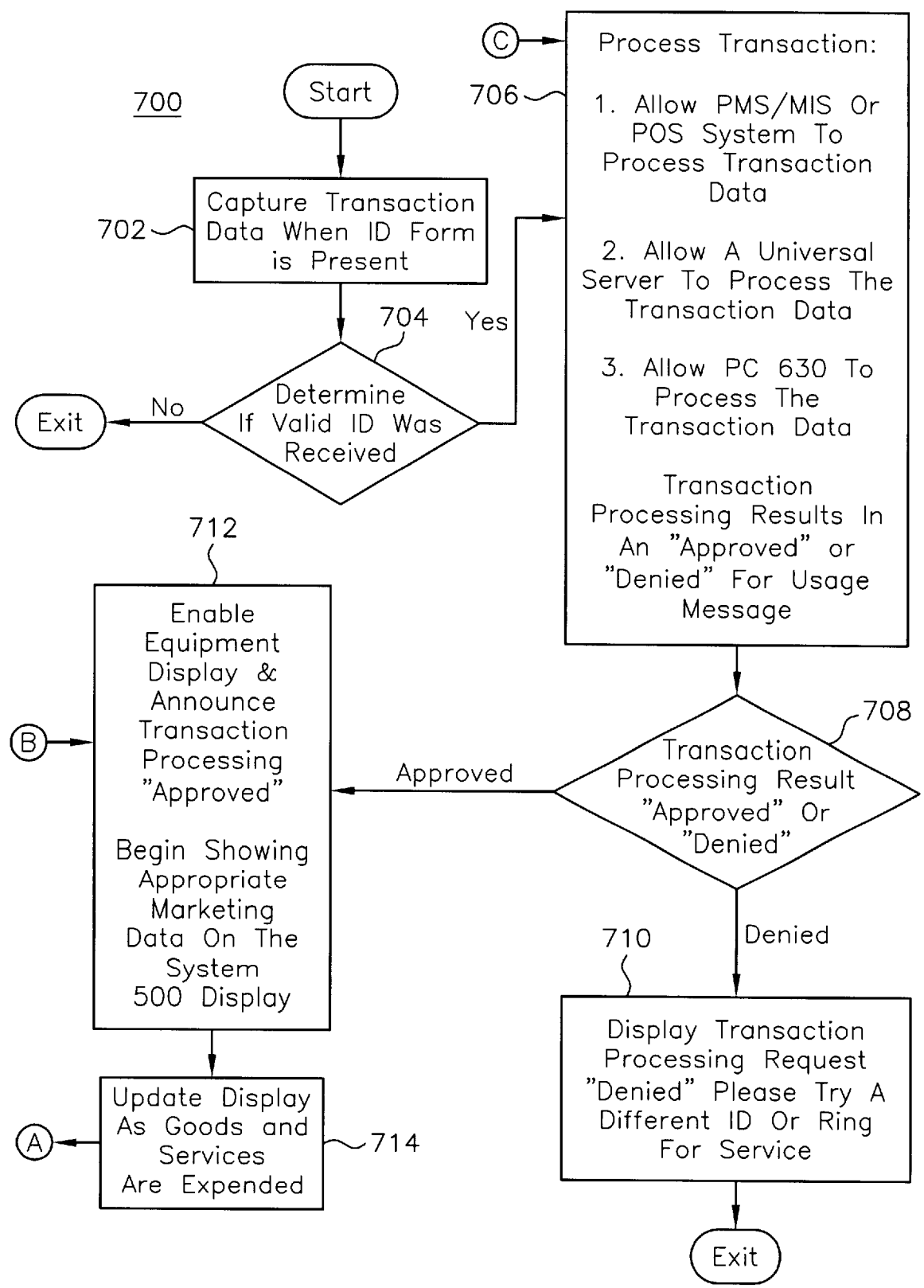
FIGS. 9A–9B shows a customer transaction routine 700 flowchart.
Figure 9B:
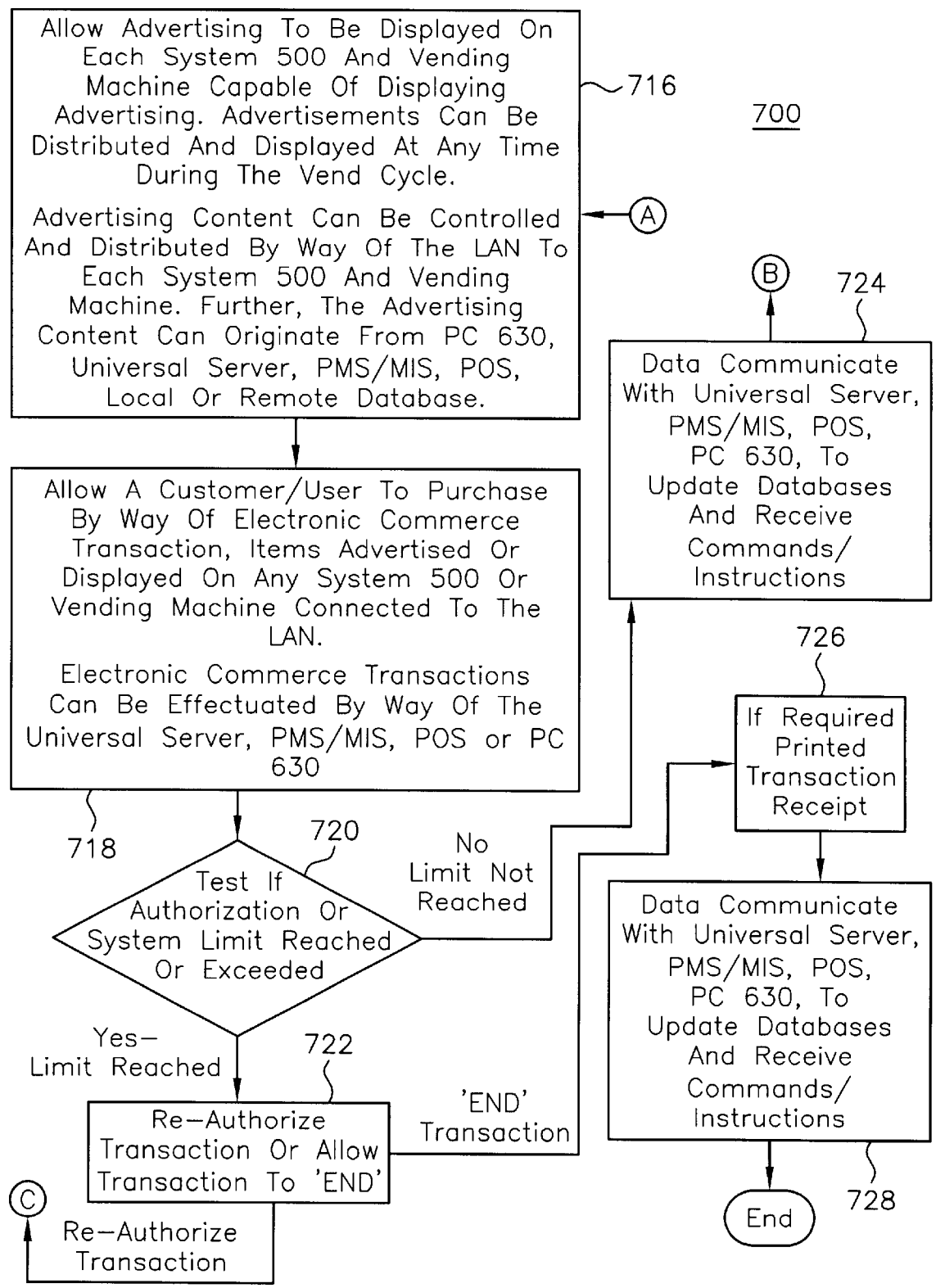

Referring to FIGS. 9A–9B, there is shown a customer transaction routine 700. Processing begins in block 702 where a "capture a transaction" command is initiated. A "capture a transaction" command is initiated when a customer/user (generally referred to as a user) inserts a valid form of ID. Valid forms of ID's can include a smart card, or a magnetic card (i.e. credit card, debit card, pre-paid, automated teller machine (ATM) or other bank or private issued card), hotel room key/card or other insertion type identifying devices. Additionally, biometric input such as, hand writing voice, finger, palm, hand, eye (iris scan) identification can also be an acceptable forms of ID. Processing then moves to decision block 704.

Processing in decision block 704 determines if valid ID data was received (presented by the user) in response to a "capture a transaction" initiated command. If the resultant is in the affirmative, that is the user has presented valid ID and the data from the ID has been recorded, then processing moves to block 706. If the resultant is in the negative, that is no valid ID was presented, the processing is returned to the calling routine.

Processing in block 706 creates a transaction record based in part on the recorded ID data. Transaction processing can then-proceed as programmed in several different formats. In a first transaction process a PMS/MIS or POS system can process the transaction data and determine the validity of the transaction to continue "approved" use or "denied" use of the vending equipment. Any suitable method of transaction verification can be employed including local or remote databases, credit bureaus, corporate accounts, in-store accounts, or very important person (VIP) memberships to name a few.

In a second transaction process, a server, such as a universal server can process the transaction data and determine the validity of the transaction to continue "approved" use or "denied" use of the vending equipment. Any suitable method of transaction verification can be employed including local or remote databases, credit bureaus, corporate accounts, in-store accounts, or very important person (VIP) memberships to name a few.

In a third transaction process, a PC 630 can be used to determine validity of the transaction to continue "approved" use or "denied" use of the vending equipment. Any suitable method of transaction verification can be employed including local or remote databases, credit bureaus, corporate Accounts, in-store accounts, or very important person (VIP) memberships to name a few. In an exemplary embodiment, such a transaction processing method could effectuate the use of Internet based data connections, intranet, extranet, telecommunication line such as phone, ISDN, ADSL, or VSAT satellite communications. The transaction processing can be transparent and undetectable to a user of PC 630.

When transaction processing is complete and a resultant of the transaction process is determined, processing moves to decision block 708. In decision block 708, a test is performed to determine if the use of the vending equipment has been authorized. If the resultant is in the affirmative, that is the resultant of the transaction processing is "approved," then processing moves to block 712. If the resultant of the transaction processing is in the negative, that is the resultant of the transaction processing is "declined," then processing moves to block 710.

Processing in block 710 informs the user that the transaction-processing attempt was. "declined." Processing control is then returned to the calling routine.

Processing in block 712 informs the user the transaction processing was "approved" and enables the vending for use. During use, relevant marketing data, and advertisements can be displayed on the system 500 interconnected with the vending machine. Relevant marketing data can include current date and time, location, total sale amount, and where appropriate total copies, faxed pages, time used, PC usage, online usage, electronic commerce charges, total prints and other relevant marketing data. Processing then moves to block 714.

Processing in block 714 refreshes the display as advertisement, or marketing data change. Processing then moves to block 716 of FIG. 9B.

Processing in block 716 allows advertising to be displayed on each system 500 or vending machine capable of displaying advertising. Advertisements can be distributed and displayed at any time during the vend cycle.

In an exemplary embodiment, a universal server distributes advertising content over a network 600. When an advertisement is routed to a system 500 or vending machine currently in use, the system 500 or vending machine in use, determines if an advertisement can be displayed. If an advertisement can be displayed at the current time then the advertisement is displayed. The routing criterion attached to the advertisement determines which systems 500 or vending machines will accept and display the advertisement.

For example, if a tennis shoe advertisement is globally distributed and routed to all systems 500 then each system 500 or vending machine that can, will accept and display the advertisement. Alternatively, an advertisement can be target marketed to a selected group of systems 500 and vending machines. For example, it is desirable to distribute and display "run" an advertisement for a multifunction fax machine. The fax machine is target marketed to the small office-home office ("SOHO") market. By distributing the advertisement globally with attached routing criterion to only "run" the advertisement on systems 500 and vending machines in retail stores, that specialize in SOHO related business services then the advertisement will only be "run" in that market on those systems 500 and vending machines. Routing criterion can be utilized to distribute and manage advertising content by way of any universal server, over any network 600, to any system 500 or vending machine capable of displaying such advertisements. Processing then moves to block 718.

Processing in block 718 allows a user to purchase by electronic commerce, transaction items advertised and displayed on any system 500 or vending machine capable of displaying the advertisements. The electronic commerce transaction can be processed as previously disclosed in processing block 706. Processing then moves to decision block 720.

Processing in decision block 720 tests to see if any authorization amounts or other system limit settings have been reached or exceeded. If the resultant of the test is in the affirmative, that is an authorization amount of system limit has been reached or exceeded, then processing moves to block 722. If the resultant is in the negative, that is an authorization amount or system limit has not been reached or exceeded, then processing moves to block 724.

Processing in block 724 data communicates with the universal server. The universal server can effectuate control of the system 500, request certain data be transmitted, or conduct other types of data communication as appropriate. Processing then returns to block 712.

Processing in block 722 can re-authorize transaction data. The users can be prompted to present ID again or choose to allow the same transaction data to be reprocessed. Alternatively, a user can terminate a transaction. Should a user decide to present ID or give consent to a re-authorizing of previous transaction data, processing moves to block 706. If a user decides to terminate the transaction or the universal server or system 500 or vending machine decides to terminate the transaction, processing moves to block 726.

Processing in block 726 terminates a transaction by disabling the appropriate vending machines and printing a transaction receipt. Printing of a receipt can be optional or at the user's request. Processing then moves to block 728.

Processing in block 728 data communicates with the universal server. The universal server can effectuate control of the system 500, request certain data be transmitted, or conduct other types of data communication as appropriate. Processing is then returned to the calling routine.

Figure 10:
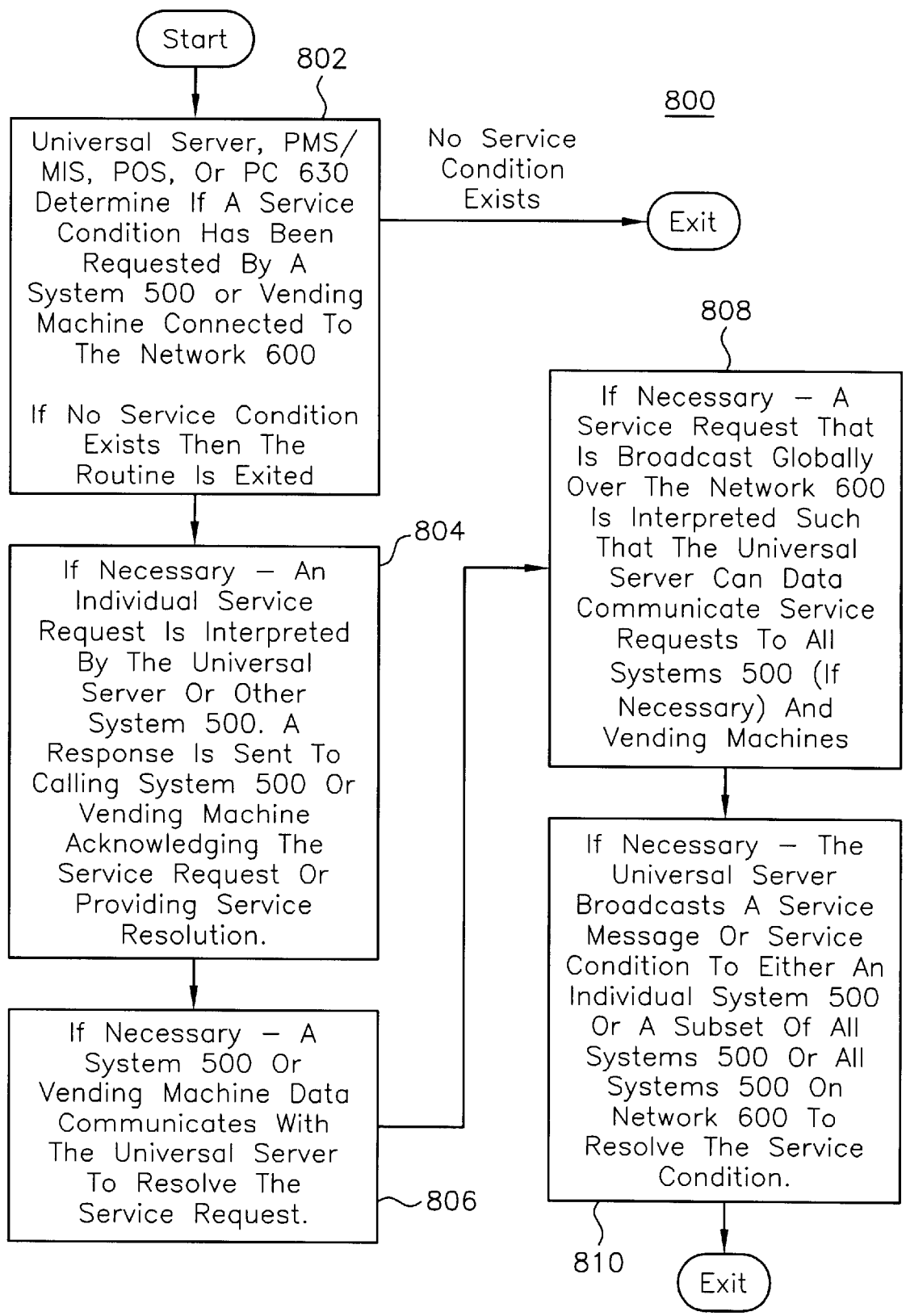
FIG. 10 shows a service routine 800 flowchart.

Referring to FIG. 10, there is shown a service routine 800. To handle a variety of service issues, a plurality of systems 500 can in dependently request a response from a universal server. Networks may vary from location to location with respect to the type and quantity of vending equipment, and systems 500 networked. Furthermore, remedies to problems such as "out of supplies," and appropriate responses to "alarm conditions" can vary in accordance with a particular location desire, specification, or business policy. With the vast combinations and variations in appropriate responses to service requests initiated by a system 500, in an exemplary embodiment, it is desirable that the universal server respond in accordance with the programmed desires of the network administrator/location.

Through non-limiting example, reliance on a universal server to administer service responses to a plurality of systems 500 begins processing in block 802. The universal server is interconnected with a plurality of systems 500 and a plurality of vending machines by way of a first LAN 622 and/or a second LAN 626. In block 802 the universal server, PMS/MIS 620 or POS system 614, or PC 630 determines if a service condition has been requested by a system 500 or a vending machine connected to the network 600. Such service conditions can include out of supply, determination of a lengthy period of time without usage, inability to successfully complete a transaction, and inability to print a receipt. In addition, security alerts and other service conditions can be transmitted for processing. Processing then moves to block 804.

Processing in block 804 interprets a service request and transmits a response to the individual system 500 requesting service. The transmitted response can serve as an acknowledgement of receipt of the request or can serve as an instruction to take action, or correct a problem.

As an example, if a system 500 were to request a response to "out-of-paper" error detection, the universal server by way of programming by the network administrator can respond to the requesting system 500. The response to the requesting system 500 could be an "open paper supply drawer" command. By way of solenoid control means 528 the requesting system 500 can "open the supply door" and prompt the user to restock the paper supply. Processing then moves to block 806.

Processing in block 806 data communicates with the universal server and can transmit a plurality of responses to take affirmative action to any appropriate system 500 on the network 600. An individual system 500 can data communicate with a second system 500 to "signal" awareness of the service condition and resolve the service condition.

As an example, if a system 500 were to request a response to "security breach" error detection, the universal server by way of programming by the network administrator can respond to the requesting system 500, or any other system 500 on the network 600. The response to the appropriate system 500 could be a "lock the 24-hour access front door" command. By way of solenoid control means 528 the appropriate system 500 can "lock the 24-hour access front door." In addition, the universal server can use "appropriate means" to contact the police or storeowner to report that a theft may be in progress. Appropriate means for the universal server could include interfacing to the in-store security system.

As a second example, if a system 500 were to request a response to a "general alarm condition" as might be detected by way of hardware security interface means 522 the universal server could respond. The response from the universal server could be an affirmative action command to "sound an alarm" at a remote location such as a front desk or security office. In addition, commands could be transmitted to the remote site to activate a warning system in proximity to the universal server or in proximity to the system 500 detecting the "general alarm condition." If the "general alarm condition" is in error or the threat is no longer present then the universal server can data communicate to the plurality system 500 or warning systems requesting service to "deactivate and reset" the hardware security interface means 522, including alarm means 524. The universal server can take additional affirmative action. Contact to a remote site can be initiated. Remote sites can include the front desk of a hotel, security office, or police station.

The universal server can use any means available by way of network 600 to initiate contact with a remote location. For example, the universal server could by way of modem 544, voice record and playback means 570 (including microphone 572, and speaker 574), and video record and playback means 576 (including camera 578, first display means 582, and second display means 580) communicate with a security, agency. Processing moves to block 808.

Processing in block 808 interprets data communication broadcast on network 600 by a plurality of systems 500. Individual system 500 may request service data to be entered into a service database controlled by the universal server.

For example, when a system 500 detects that a transaction has concluded on a particular vending machine controlled by said system 500, a transaction complete service record can be sent to server 632. Server 632 in accordance with programming from a network administrator may store the record in a transaction database, and respond to the service request from the said system 500 by data communicating an acknowledge signal. A server 632 can be a universal server. Processing moves to block 810.

Processing in block 810 allows the universal server to broadcast a service message to either an individual system 500, a subset of all systems 500 or all systems 500 on a network 600. A broadcast service message can include changing system 500 or vending machine operating parameters (such as pricing). A universal server can place a system 500 or vending machine in or out of service or choose to print on a network 600 printer. The systems 500 can respond to a service broadcast with an acknowledgement of a message received or a request to re-send the service broadcast. All network 600 data communications are in, accordance with established network protocol programming. Processing then returns to the call routine.

Figure 11:
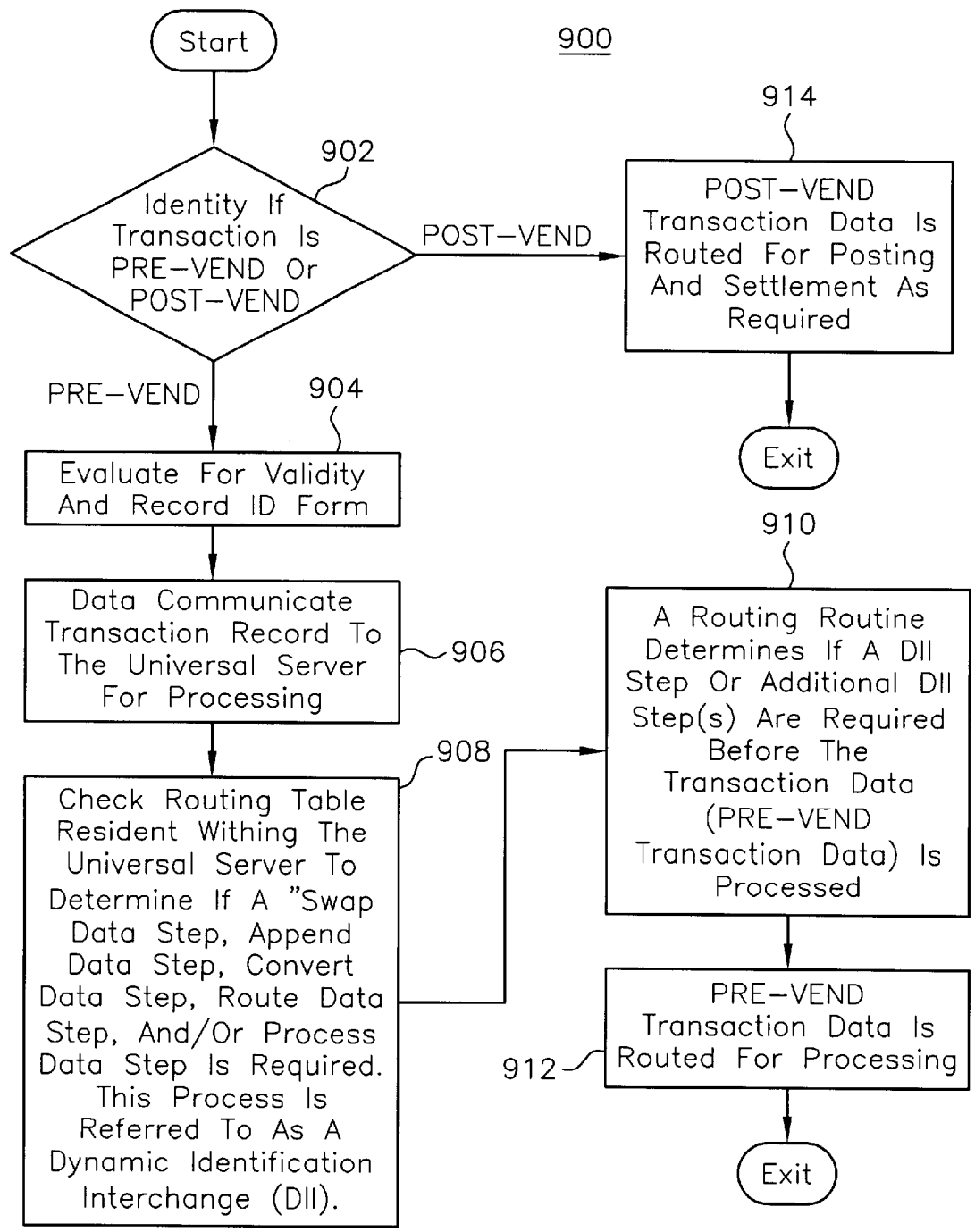
FIG. 11 shows a transaction routing routine 900 flowchart.

There is shown in FIG. 11, a transaction routing routine 900. Processing begins in decision block 902, wherein transaction data is evaluated to determine if it is PRE-VEND or POST-VEND transaction data. If the resultant is that the transaction data is PRE-VEND transaction data, that is the customer has not yet used the vending equipment for a product or service, processing moves to block 904. If the resultant is that the transaction data is POST-VEND transaction data, that is, the customer has previously been authorized to use the vending equipment and has now concluded the vending transaction, processing moves to block 914.

In block 904, any acceptable form of identification (ID) presented by a customer or other person in any system 500 connected to the first LAN 622 or the second LAN 626 is read/processed/measured/extracted/obtained or otherwise recorded. Acceptable forms of identification can include a smart card, or a magnetic card (i.e. credit card, debit card, prepaid, automated teller machine (ATM) or other bank or private issued card), hotel room key/card or other insertion type identifying devices. Additionally, biometric input such as handwriting, voice, finger, palm, hand, eye (iris scan)

identification can also be an acceptable form of ID. For disclosure purposes, a first and second LAN 622 and 626 is generally referred to as a network 600. Processing then moves to block 906.

In block 906, the identification data obtained in block 904 by the presentation of an acceptable form of ID is data communicated to universal server by way of the first LAN 622 and/or the second LAN 626. Processing then moves to block 908.

Processing in block 908 checks a routing table resident within the universal server. A routing table determines if a transaction "swap data step, append data step, convert data step, route data step, and/or process data step" is required. Said transaction "swap data step, append data step, convert data step, route data step, and/or process data step" processing is referred to as a dynamic identification interchange (DII). The DII process accepts a first identification form/transaction form and substitutes the first form for a second form. For example, a hotel room key/card may be accepted as a first form of ID and in a DII processing step substituted for or appended to a second form of ID, a credit card. This process can allow a user to have goods and services billed to a credit card by being identified first with a hotel room key/card. Processing then moves to block 910.

In an exemplary embodiment, a user registered with a hotel may present as a first form of ID a fingerprint and in a DII processing step have a hotel PMS/MIS system substitute or append a room number as a second ID form. When the user has completed use of the vending machine, a bill can then be posted to a hotel room record within the hotel's PMS/MIS system.

In another exemplary embodiment, a customer can present an ACCESS card (such a smart card) as a first form of ID. The universal server can evaluate the ID form as presented and grant access to an unattended 24-hour access area. The same form of ID can then be presented in a variety of vending machines. Upon the presentation of the first form of ID in these vending machines the DII processing, can substitute or append a second form of ID, an in-store account number. As the customer uses a plurality of vending machines for goods and services transaction billing can be posted to the in-store customer's account.

In another exemplary embodiment, a customer can present a first form of ID requesting to use a vending machine. Through DII processing it may be determined that the customer qualifies for special pricing, or has earned a promotional reward. The DII process step could substitute or append a second form of ID, such as a database record number to the transaction record. The database record number could record the promotional reward status and further request a second DII processing step. This second DII processing step could append from a third data source relevant customer information (i.e. name and address). Any number of DII steps could be requested without limitation. The full transaction record could then be recorded in a database. Using this newly created data record, information could be mailed or the customer otherwise contacted with regards to the promotional reward. At the same time the DII processing is occurring, a service request can be initiated by calling service routine 800. With instructions from the DII settings, including pricing in the system 500 or vending machine the customer is being authorized to use, can be reprogrammed. Upon authorization approval, the vending machine and its performance will be custom programmed for this customer's use.

In another exemplary embodiment, a user presents a first form of ID and desires to use a PC 630. A DII processing step can send instructions to a server controlling a PC 630 or to a PC 630 directly. While the DII processing step is determining if a second form of ID is required and how the transaction should be routed, PC 630 reconfigures the desktop. In such a scenario, the user has been previously allowed to configure the PC 630 as desired to suit processing need and ease of use requirements. The DII step invokes in the PC 630, a reset function to access the user's established profile and reconfigures the PC 630 to the user's settings. In this fashion, a PC 630 user can travel to a PC 630 located in any location of the world and by way of a common network database, reconfigure the PC 630 to his or her preferences. In the scenario where there are thousands of franchised locations desiring to have PC's 630 in thousands of in-store and out-of-store locations, a user can present a first form of ID and have any PC 630 reconfigured to their personal preferences.

In another exemplary embodiment, a user can present a first form of ID at a PC 630. A DII processing step can determine the status of the user (number of previous visits, preferences) and prompt the user to answer customer survey questions. DII processing can route transaction information and customer survey responses to any desired location or database. Additionally, through DII processing, accounts can be established to allow an electronic commerce transaction to occur. Such accounts can include customer identification, customer purchasing history, customer credit limits, other customer information, electronic commerce accounts, payment accounts, shipping accounts, local franchise store locations, local in-store customer account information and other related account detail. Should a customer desire to purchase products through an electronic commerce transaction from a distribution fulfillment center ("DFC") located anywhere in the world, a DII processing step can effectuate the transaction. A distribution fulfillment center is any store, manufacturer, warehouse, or other repository of goods and services from which a customer can purchase said goods and services.

In addition, a DFC can initiate a transaction and use the DII processing to bill a customer who may have an account accessible by way of the present invention. Such DFC initiated transactions can be particularly useful for billing a group member, club member or customer with an association to a business, store, or group.

Any form of ID can be presented to a DII resident on or accessible by a universal server, resident in or accessible by a system 500, resident on or accessible by a vending machine, or resident in a database accessible by a universal server, system 500, or vending machine. If the transaction requires a DII processing step, the step can be performed transparent to the users or with the user's input. Furthermore, the DII can encrypt and decrypt transaction data, whereby secure transaction processing can be accomplished. DII processing can occur locally or remotely worldwide.

Processing in block 910 invokes a routing routine to determine if a DII step is required and where the resultant transaction processing should be routed. Accordingly, a transaction can be DU processed, if necessary, and routed to a transaction processor. Such a transaction processor could be the in-store or hotel PMS/MIS or POS system. If the transaction is a credit card transaction that requires the step of "authorization," "sale," "settlement," or other credit card processing step, the hotel or retailer's PMS/MIS or POS system can complete the processing step. Should the PMS/MIS or POS system be unable to complete these types of transactions, the universal server, system 500 or other data processing device in a network 600 can complete these steps. Processing then moves to block 912.

In an exemplary embodiment, secured transaction processing referred to in block 910 can be by way of VISA/MASTERCARD Secure Electronic Transaction ("SET") protocol standard. Furthermore, SET transaction processing can be implemented by way of a system 500, a vending machine, or a universal server. The SET protocol standard for secured transaction processing can be implemented with other data processing equipment accessible by a system 500, vending machine or the universal server.

Processing in block 910 can effectuate the following exemplary embodiment. A customer can enter or check into at hotel or retail outlet, wherein a valid credit card is entered into the hotels or retailer's PMS/MIS system, or POS system. The customer can then be given an ID form, such as a card, smart card, hotel room key/card, or present another form of ID (biometric). This second form of ID can be entered into the hotel's or retailer's PMS/MIS or POS system. The customer can then present the second ID form to facilitate a vending transaction in any system 500. Transaction information by way of the network 600 can data communicate to the universal server transaction information to obtain first or other ID forms (such as payment or account ID forms). DII processing can then access the hotel's or retailer's PMS/MIS or POS system and obtain the customer's valid credit card or billing information. The credit card or billing data can be appended to the transaction record. The new appended transaction record can then be routed for processing. Transaction processing can include, but is not limited to adding the charges to a hotel bill (folio), paying cash, charging a smart card or credit card, charging an account, or recording the charges in a database.

Processing in block 912 routes PRE-VEND transactions for validation. Transaction validation can occur in a plurality of ways dependent on server programming, hotel/retail outlet preference, as well as based on card type, and/or ID type. Transactions can be validated at a remote location, such as remote location 616 whereby access to remote location 616 is by way of a system 500, network 600, and POS system 614. In addition, transactions can be validated at a remote location, such as remote location 618 whereby access to remote location 618 is by way of a system 500, network 600, and PMS/MIS system 620. Furthermore, transactions can be validated at a remote location, such as remote location 606 by way of a system 500, network 600, and PC 630. Transactions can also be validated at a remote location, such as remote location 634 whereby access to remote location 634 is by way of a system 500, network 600, and server 632. Server 632 is a universal server. Furthermore, transactions can be validated at a remote location, such as remote location 636 whereby access to remote location 636 is by way of a system 500. Additionally, transactions can be validated by way of a database resident in a system 500, a POS system 614, a server 632, or a PMS/MIS system 620. Transactions can also be validated by way of a database accessible by a system 500, a POS system 614, a server 632, a universal server, or a PMS/MIS system 620.

The resultant of the transaction processing is data communicated to the requesting system 500. If the resultant is in the affirmative, the customer is "approved" to use the vending equipment, then the requesting system 500 activates the vending equipment for use by the customer. If the resultant is in the negative, that is the customer has been "declined" for vending machine usage, then the requesting system 500 denies usage of the appropriate vending machine. The customer is notified of the "declined" status by way of LED indicator means 504, voice record and playback means 570, first display means 582, or other indicators means. Processing then moves back to the calling routine.

Processing in block 914 routes POST-VEND transaction data POST-VEND transaction data includes PRE-VEND identification data, in addition to the marketing data generated resultant from the vend process.

Examples of PRE-VEND transaction data can include identification, date, time, appended ID data, sale limits, system pricing, merchant identification, routing codes, and system 500 ID codes. Additional PRE-VEND transaction data can include network traffic codes, authorizing sale amounts, system 500 configuration parameters, database access codes, remote location codes, currency codes, terminal codes, and other routing and system operational codes.

Examples of the marketing transaction data can include sale amount, finish date, finish time, total copies, total fax pages sent locally, total fax pages long distance, total fax pages sent internationally, and total fax pages received. System 500 and network programming control local, long distance, and international faxing delineation. Additional marketing transaction data can include total PC 630 general usage time, PC 630 applications utilized/usage time, PC 630 online usage (site contact specific, service specific, time used pet site), total printed output count from a plurality of printers, and total scans made into the PC 630. Additional marketing data can include electronic commerce purchases, smart card re-valued totals, laptop usage, data port usage, and/or other marketing/transaction measurement/indicator data.

Routing of post-vend transaction processing by way of the DII is resultant from the updating of processing databases, accounting databases, and marketing databases in which the DII controls, manages, and/or has access to as shown in block 908. Further, post-vend transaction processing by way of the DII is resultant from post processing of credit cards, smart card and other types of transactions that require an intervening process to effectuate an electronic transfer of funds.

PRE-VEND and POST-VEND transactions can be processed by way of the PC 630 simultaneously and transparently to a user of the same PC 630. This functionality allows the PC 630 to be a vending machine interconnected with a system 500, a universal server such as server 632, PMS/MIS system 620 or a POS system 614. Furthermore, the PC 630 can implement the DII transaction processing as disclosed in block 908 and block 912. Additionally, the PC 630 can implement the DII locally with reliance on a remote site/server over a TCP/IP network, a Microsoft NT network, a Novell Netware network, an Internet connection, a VSAT connection, or other network interface. Also, the PC 630 can implement the DII residing remotely on a remote site/server over a TCP/IP network, a Microsoft NT network, a Novell Netware network, an Internet connection, a VSAT connection, or other network interface.

Figure 12:
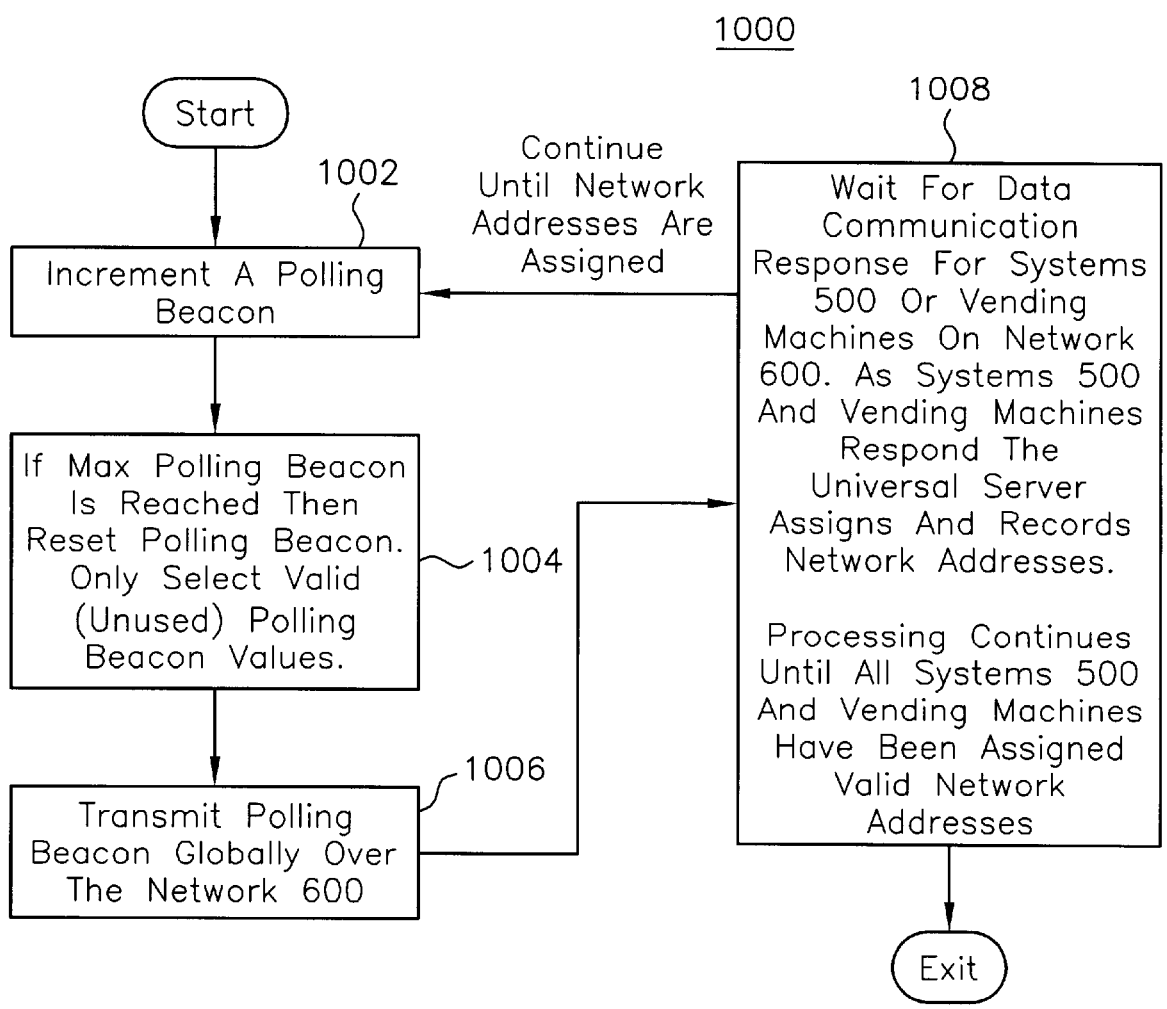
FIG. 12 shows a network self configure routine 1000 flowchart.

There is shown in FIG. 12, a system self-configuring routine 1000. In an exemplary embodiment, each system 500 or vending machine can be preprogrammed with a network address ID or can have a network address ID automatically assigned. In certain network configurations a preprogrammed network address may be preferable over dynamically assigned network addressing. Both methods can be effectuated with similar results.

In an exemplary embodiment of the present invention, a self-configuring routine 1000 is disclosed although other network address schemes could be employed. Processing begins in block 1002, wherein a polling beacon address is incremented. Only unallocated polling beacon addresses are assigned. Processing then moves to block 1004.

Processing in block 1004 tests to see if the polling beacon address has reached an upper limit. If the polling beacon address has reached an upper limit, then the poling beacon address is reset to a minimum preset limit or address. Processing then moves to block 1006.

Processing in block 1006 globally transmits over network 600 a unique polling beacon address. Processing then moves to block 1008.

Processing in block 1008 waits for data communication responses from systems 500 and/or vending machines on network 600. If a system 500 or vending machine on network 600 has been preprogrammed with a network address, then said system 500 or vending machine data communicates a response to the polling beacon. If, however, a system 500 or vending machine on network 600 has not been preprogrammed, then a system 500 or vending machine desiring a network address can data communicate a response to the polling beacon. A universal server then creates (if not already created) a network configuration database. Data communication can then be conducted on network 600 with any system 500 or vending machine. Network addresses can take the form of Internet IP type addressing.

Processing in the system self-configuring routine continues until each system 500 and vending machine has been assigned a valid network address. Processing then returns to the calling routine.

Figure 13:
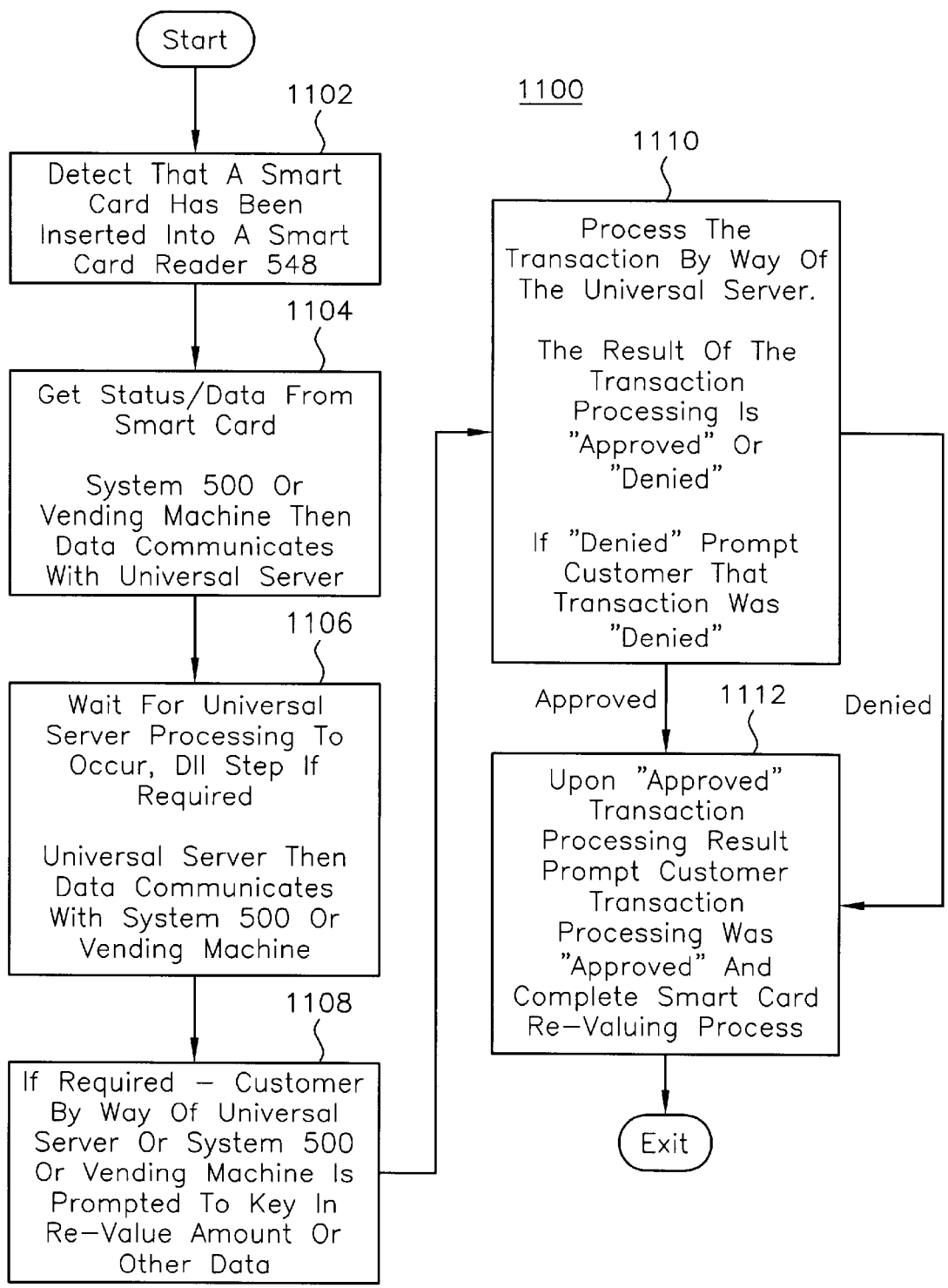
FIG. 13 shows a smart card re-value routine 1100 flowchart.

There is shown in FIG. 13, a re-value smart card routine 1100. Processing begins in block 1102, wherein a smart card is inserted into a smart card reader/writer, such as smart card reader/writer 548. Processing then moves to block 1104.

In block 1104, the system data communicates to the universal server the current "status" of the smart card and the fact that it has been inserted into a system 500. The universal server can then request that a portion or the entire contents of the smart card to be data communicated to the universal server, or any other device on the network 600. Processing then moves to block 1106.

In block 1106, the universal server processes the data communication between the universal server, system 500 (containing the smart card), and any other device as necessary that is present on network 600. If required, the universal server can request a DII processing step to obtain appropriate or verify transaction data. Processing then moves to block 1108.

Processing in block 1108 is responsive to the resultant obtained from processing in block 1106. Furthermore, if a DII response requires additional information, processing in block 1108 prompts the user for such information/data. For example, a user can be prompted to enter, by way of keypad 540, the amount of money/units/credit to transfer to the smart card from sources acquired by the DII processing step. If additional data, such as the presentation of a credit card is required to effectuate the transfer of cash value, the customer can be prompted to "swipe" or otherwise present a valid credit card. If the universal server is able to utilize the DII to obtain data required to effectuate transaction processing, a customer may only be asked to "confirm-to-continue" with the transfer. In another exemplary embodiment, the re-valuing by way of the universal server, and/or DII processing can be seamless to the customer and transfers funds (money/credit/units) to the smart card without any intervention by the customer. Processing then moves to block 1110.

Processing in decision block 1110 effectuates the processing of the transaction and eventual "approval" or "denial" of a request to transfer funds (money/credit/units) to the smart card. If the resultant is in the negative, that is, the transaction has been "denied" then processing returns to the calling routine. If the resultant is in the affirmative, that is, the transaction has been "approved" then processing moves to block 1112.

Upon "approval" processing in block 1112 data communicates between the universal server, system 500 containing the smart card, and any other device (as required) on network 600 to effectuate the transfer of funds (money/credit/units) and subsequent transaction processing (billing "settling" as required). The transaction is then completed, prompting the users to facilitate any final actions as may be required. If the customer desires a receipt of the transaction just completed, a receipt can be printed by any printer on network 600. Processing control then returns to the calling routine.

Figure 14:
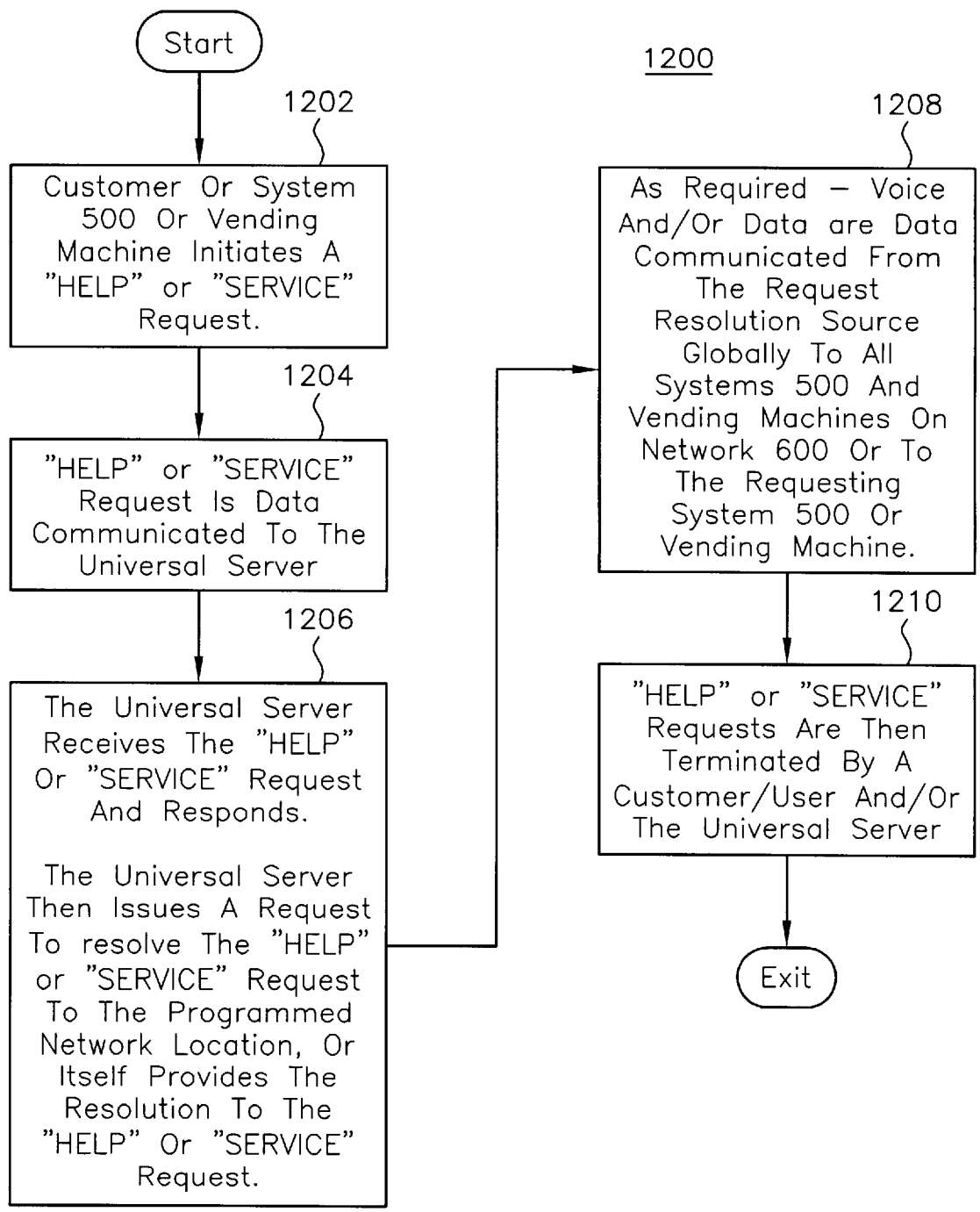
FIG. 14 shows a help desk routine 1200 flowchart.

There is shown in FIG. 14, a help desk routine 1200. Processing begins in block 1202, wherein a user at any system 500 can press a "HELP" or "SERVICE" button or otherwise request assistance. Once a request for assistance has been requested by the customer, the appropriate system 500 data communicates the request for service to the universal server. Alternatively, a help desk can initiate a request for "HELP" or "SERVICE" broadcasting such a request to one or more systems 500 or vending machines. The help desk can intervene, initiating a "HELP" or "SERVICE" request to effect changes/upgrades/repairs to any vending machine, any system 500, any universal server, or any other equipment residing on the network 600. Furthermore, a help desk can intervene, initiating a "HELP" or "SERVICE" request to page a customer in a hotel, retail outlet, or other location in proximity to a system 500 or vending machine. Processing then moves to block 1204.

In block 1204, a data communication between the universal server and the system 500 requesting "HELP" or "SERVICE" occurs. Such a request is resultant in the universal server identifying where and what kind of "HELP" or "SERVICE" is available and data communicating to a different system 500 or network location requesting specific "HELP" or "SERVICE". Processing then moves to block 1206.

In block 1206, the universal server receives the "HELP" or "SERVICE" data communication by way of the calling system 500. The universal server then responds to the requesting system 500, acknowledging the request. The universal server then issues a request for "HELP" or "SERVICE" to the programmed network location where service personnel or data processing equipment reside. The universal server then effectuates the data communication between the user who requested "HELP" or "SERVICE" and the "HELP or "SERVICE" source.

The term "HELP" or "SERVICE" can include a response to interactive advertising, electronic commerce activities or processes, vending machine usage requests, emergency needs, and other general purpose question and answer requests. The term "LIVE" can include viewing, talking, and exchanging data with another person or data processing equipment by way of a system 500, network 600, or other processing equipment.

"HELP" or "SERVICE" can be by way of "LIVE" interaction with a person or by way of prerecorded voice and/or video available on the universal server, or accessible by the universal server from a remote help desk location. Any system 500 residing on a network 600 can be utilized to data communicate with any other system 500 residing on the network 600 to provide data communication for "HELP" or "SERVICE" requirements. In addition, any system 500 residing on the network 600 can, by way of the vending machine interconnected with said system 500, such as a PC 630, data communicate with a remote location to obtain "HELP or "SERVICE" data. Then, by way of said system 500 data communicate to the system 500 originally requesting "HELP" or "SERVICE". The original system 500 requesting "HELP" or "SERVICE" can be the same system 500 in which an interconnection with a vending machine, such as a PC 630 is relied upon to obtain "HELP" or "SERVICE" from a remote location.

Such a remote help desk can reside on-site or off-site. Such on-site locations can include a front desk of a hotel, a customer service counter of a retail outlet, or a remote location accessible by way of phone, Internet, VSAT, other communication forms. Available help desk information/resources can include voice and/or video data communications.

When a "HELP" or "SERVICE" request is resultant from the help desk discovering that service, change, or an adjustment is required, the prescribed service, change, or adjustment can be made over network 600. Whether the change is to a system 500, the universal server, or any vending machine (for example a PC 630) interconnected with a system 500 changes can be made by way of network 600. Such service, changes, adjustments, upgrades, and repairs can be effectuated by way of the data communication at any time with or without a "HELP" or "SERVICE" request, transparent to the customer.

In an exemplary embodiment, a customer at a personal computer presses the "HELP" button and a message is data communicated to the universal server. If "HELP" can be obtained at a remote site on the Internet, a response to the system 500 sending the "HELP" message would be to access the Internet site and display the "HELP" solution. The universal server could respond to the system 500 requesting the "HELP" message with a network ID location of another system 500 or a geographic location such as the front desk of a hotel or in the security office for resolution to the "HELP" request. Alternatively, the universal server could respond to the system 500 sending the "HELP" message, by data communicating a response comprising voice and video stored on the universal server or accessible by the universal server. Such "HELP" message can include digitized video clips, digitized sound clips, or other digital messages.

In block 1206, the universal server responds with a data communication to the system 500 requesting "HELP" and/or "SERVICE. Such a data communication can include network identification and access data/instruction on how and where said system 500 can access and obtain the "HELP" and/or "SERVICE" requested by the user. Such a data communication by the universal server may also be data communicated to a plurality of systems 500. If no "LIVE", "HELP" or "SERVICE" is available, as may be determined by the universal server, the universal server can data communicate instructive commands with the system 500 requesting "HELP" or "SERVICE". Such instructive commands can grant access to a database or identifying a database where prerecorded voice and/or video "HELP" or "SERVICE" messages can be retrieved and played to best answer a user question. Processing then moves to block 1208.

In block 1208, voice and/or video data are data communicated between the system 500, by way of the voice record and playback means 570, and/or the video record and playback means 576. When "LIVE" access to a help desk is established, a user can freely talk, listen, and/or view a "LIVE" video feed to obtain instruction and have "HELP" and/or "SERVICE" questions answered. As necessary the operator of the help desk can access the vending machine (in particular the PC 630) and aid the users in resolving operational, procedural, or other service related problems. Processing then moves to block 1210.

Processing in block 1210 allows a user, a help desk, and/or a universal server to terminate the "HELP" and/or "SERVICE" request. Processing then returns to the calling procedure.

Figure 15:
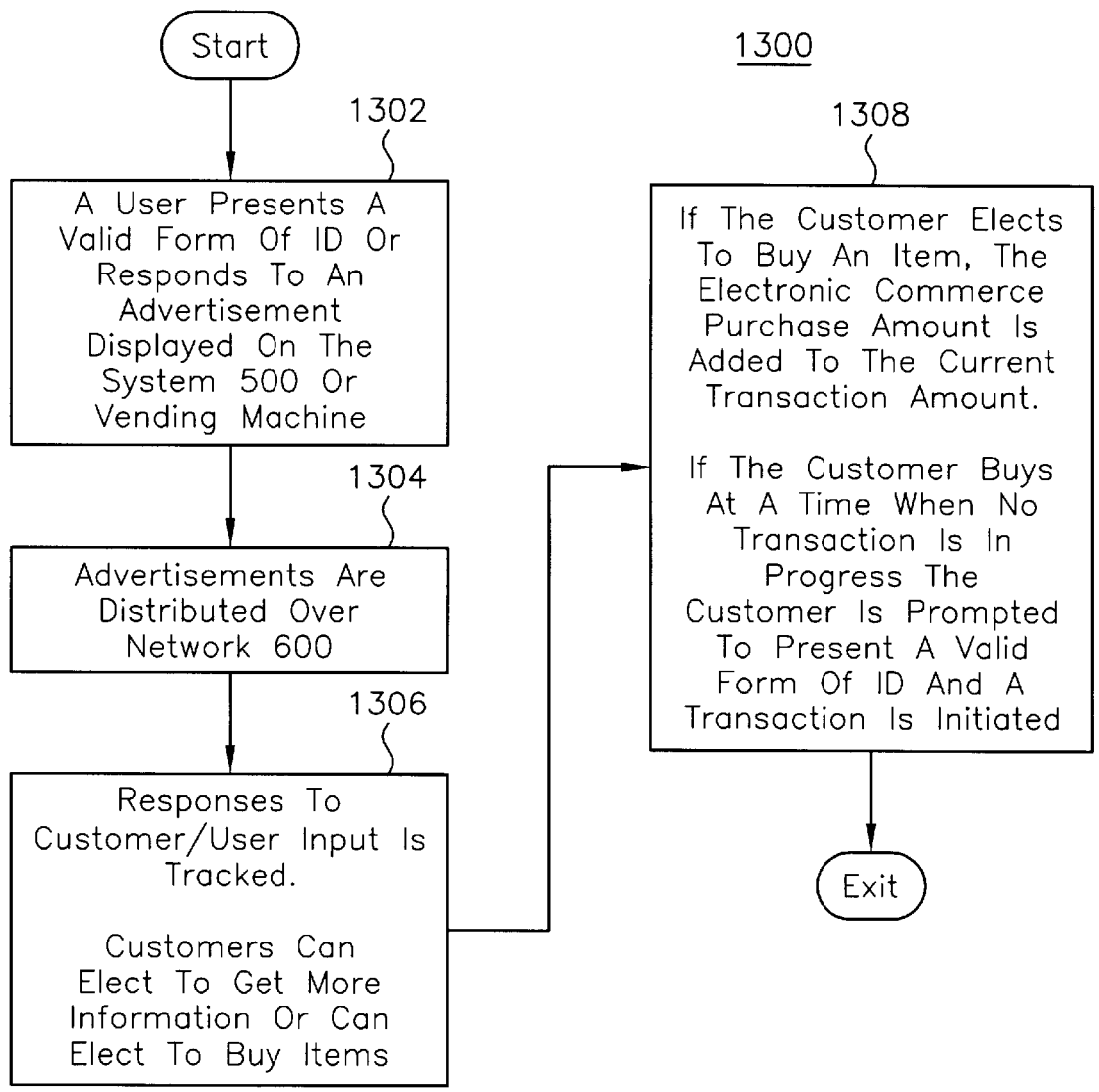
FIG. 15 shows an advertising routine 1300 flowchart.

There is shown in FIG. 15, an advertising routine 1300. Processing begins in is block 1302 when a user presents a valid form of ID at a system 500 to begin a transaction. Alternatively, processing in block 1302 can begin by way of a person responding, with a keypad 540 or other system 500 data input, to an advertisement that may be displayed on a system 500 currently not in use.

In addition to the processing disclosed in transaction routine 900, the DII can select advertising and other marketing advertisements from a database (remote database or local database). The selection of marketing advertisements can be random or in accordance with a customer profile (individual or by group type). Customer profile parameters can be accessible by the universal server and/or by way of DII process steps An individual customer profile is a profile for an individual person. A group profile is a profile that is specific to a group (i.e. A particular hotel brand or retail brand).

Furthermore, the individual and group type profiles can be the same profile or different profiles. Additionally, DII process steps can selectively choose advertising content in harmony (deduced from the individual or group profiles) at random or in accordance with predetermined universal server programming. Selection of advertising content can be audio only or visual only or a combination of both audio and visual. In the present invention, a "banner" type, "point cast" type, or "multi cast" type advertisement can be displayed on a system 500. In an exemplary embodiment, when a customer desires additional information, audio can be added to the displayed "banner" advertisement to further inform the customer. Additionally, audio can come in the form of a system 500 generated telephone call to the "banner" advertising source (business that placed the advertisement). Banner," "point cast," "multi cast" type advertisements are generally graphical advertisements commonly found on Internet web pages. In addition, full snap shot icon type advertisements, as well as full motion advertisements each with or without audio, can be displayed. Furthermore, PC 630 can deliver interactive screen saver advertising as well as each of the other types of advertising disclosed in the present invention. Advertising content displayed on either a system 500 or vending machine, such as PC 630 can be monitored, controlled, distributed, and shown by way of network 600 and a universal server.

In addition to the DII processing and data communication of a customer profile, DII processing also processes and data communicates a distribution profile. The distribution profile determines which of the systems 500, in a plurality of systems 500 residing on a network 600 will receive the current advertisement data. A distribution profile can direct advertising to a single system 500 located on the network 600 or to a subset of systems 500 (i.e. all PC 630, all copiers, all fax machines, etc.). Furthermore, the distribution profile can direct advertising to the entire population of systems 500 on the network 600. Processing then moves to block 1304.

Processing in block 1304 distributes the advertisement over the network 600 in accordance with the distribution profile. Processing then moves to block 1306.

Processing in block 1306 responds to customer input effectuated in response to any advertisement on any system 500 located on the network 600. At any system 500 on the network 600, a customer/user can elect to buy the advertised item. Other customer's/user's responses can include to "see more", detail about the advertised item, visit a web site, or place a telephone call to the advertiser or information source. Additionally, customer's/user's responses can include printing out detailed information regarding the advertisement, request a sales person to contact the customer/user later, send an Email (electronic mail), or respond to the advertisement as may be supported by the system 500. Processing then moves to block 1308.

Processing in block 1308 adds the amount of an electronic commerce purchase to the total of the current transaction. If the customer/user interacted with a system 500 in which no current transaction was in progress, the system 500 by way of the universal server will prompt the user to present a valid form of ID and start a transaction. DII processing can be relied upon to associate any form of valid ID presented to facilitate the electronic commerce purchase. Receipts or other printed documents, such as order forms or conformation forms can be printed on a printer on network 600 as required. Processing control is then returned to the call procedure.

Figure 16:
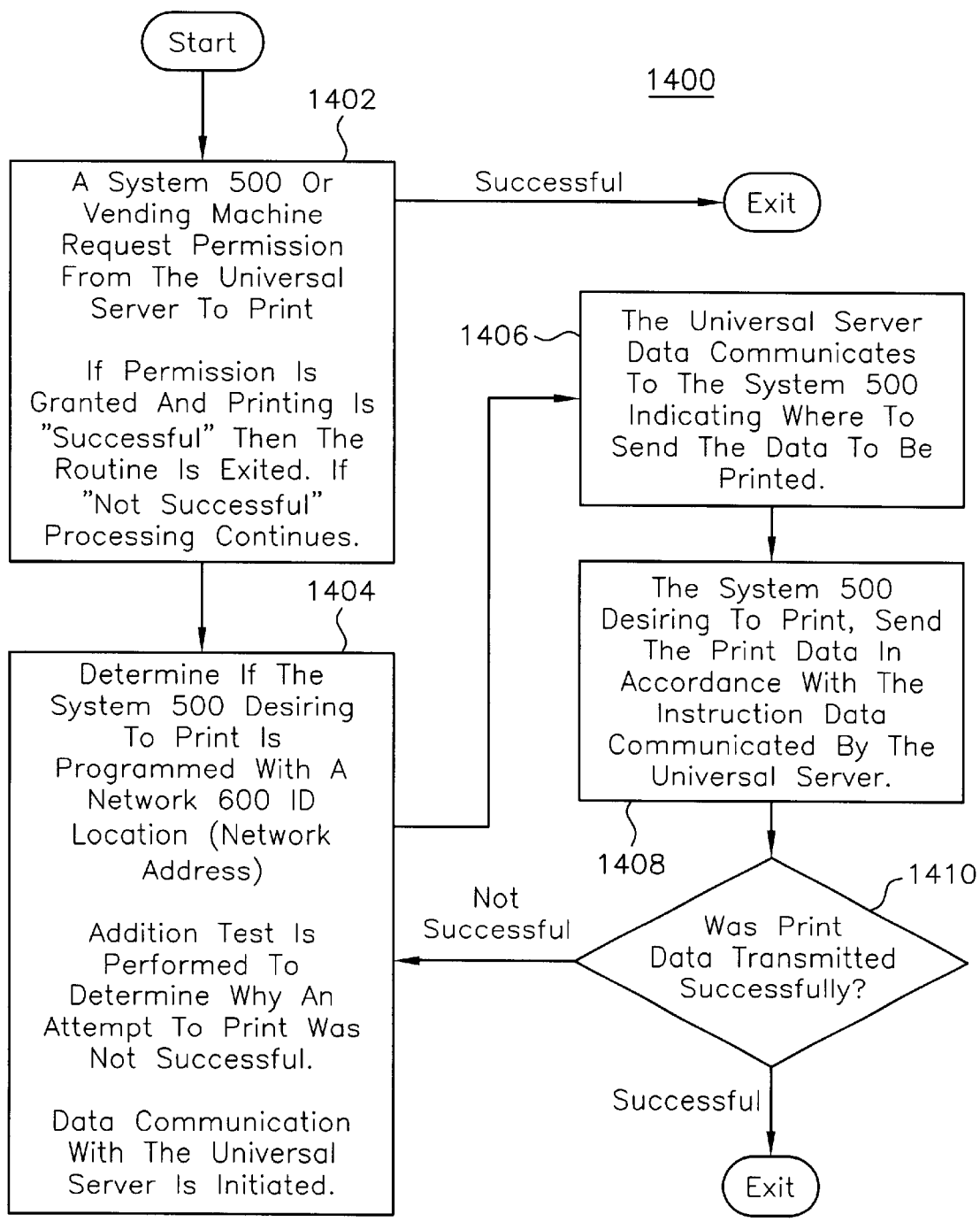
FIG. 16 shows a printing routine 1400 flowchart.

There is shown in FIG. 16, a print routine 1400. Processing begins in block 1402 when a system 500 desires to print data on a printer, such as printer 69A or printer 69B. In an exemplary embodiment, print data can be advertisement print data, transaction summary print data, receipt print data, vending machine print data, such as from a PC 630, or other print data. If a system 500 is preprogrammed with a network 600 network location ID (network address) for a printer 69A or 69B, then printing on printer 69A or 69B can be facilitated by way of a data communication between the system 500 and printer 69A or printer 69B. Subsequent to any printing, a data communication between the system 500 desiring to print and the universal server can occur, wherein the system 500 desiring to print data requests permission from the universal server to data communicate print data to printer 69A or 69B. If permission is granted and printing is successful, processing control returns to the calling procedure. If processing is not successful, then processing moves to block 1404.

Processing in block 1404, determines if the system 500 desiring to print data is preprogrammed with a network 600 location ID (network address) to facilitate remote access to the printer 69A or 69B. Additionally, processing in block 1404 tests to see if an attempt to print to printer 69A or 69B was unsuccessful (printer off-line, out-of-paper, etc.). In either case, a request as to "where to send the print data" is data communicated to the universal server. Processing then moves to block 1406.

In block 1406, a response from the universal server is data communicated to any system 500 requesting "where to send the print data". If a printer is available, the universal server can respond by sending the requesting system 500 a data communication including the network 600 location ID where print data can be data communicated. If no printer is available, or the universal server desires to capture the print data, the universal server can data communicate to the system 500 requesting to data communicate print data, the instructions to send the print data to the universal server. Processing then moves to block 1408.

In block 1408, the system 500 desiring to print data, communicates the print data in accordance with instructions received from the universal server. If there is an available printer, the universal server can direct the system 500 desiring to print data to print data on the available printer. If the universal server determines that there is not an available printer, or desires to capture the print data the universal server can accept the print data if the universal server captures the print data, the print data can be saved, save to be printed later, and/or redirected to a network 600 destination. Furthermore, print data can be redirected to a remote location, such as remote location 606, 616, 618, 634, and/or 636. Processing then moves to decision block 1410.

Processing in decision block 1410 determines if the print data was successfully data communicated. If the resultant is in the affirmative, that is, the print data was either printed or data communicated without error then processing control returns to the call procedure. If the resultant is in the negative, processing control moves back to block 1404, wherein the universal server can intervene to best complete the print data request.

Figure 17:
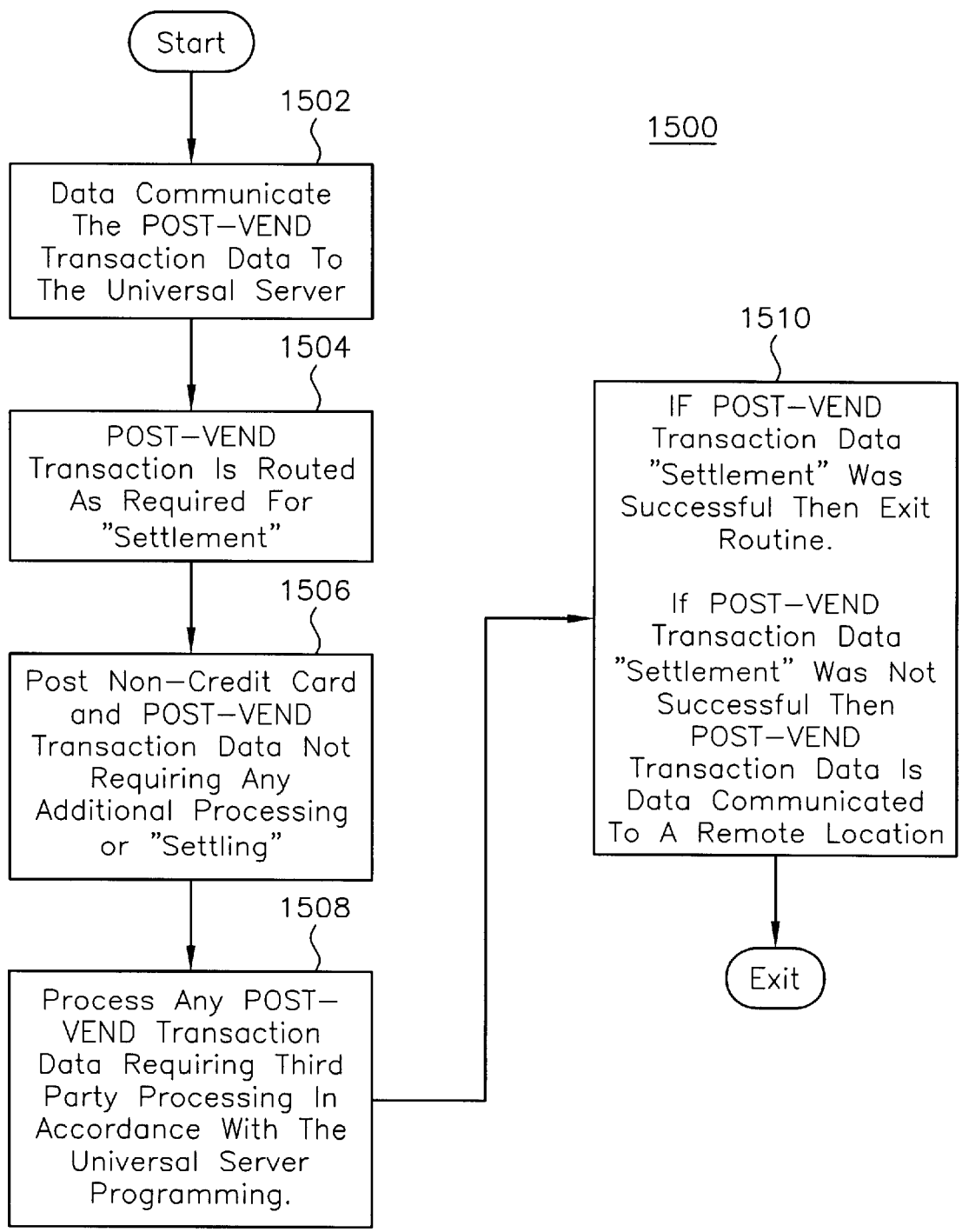
FIG. 17 shows a POST-VEND transaction processing routine 1500 flowchart.

There is shown in FIG. 17, a POST-VEND transaction processing routine 1500. Processing begins in block 1502, wherein a POST-VEND transaction is data communicated to the universal server. Processing then moves to block 1504.

In block 1504, the universal server, by way of DII processing, (as required), routes the POST-VEND transaction for payment, posting, or billing. The process of payment, posting or billing is generally referred to as "settling" or a "settlement" transaction. Transactions can be routed based on transaction type (credit card, smart card, pre-paid card, hotel key/card, or biometric) to different remote locations, or to different on-site or off-site databases. Furthermore, post-vend transactions can be routed based upon preprogrammed criteria. For example, all credit card transactions requiring "settlement" can be routed to a first credit bureau until a certain gross daily, monthly, annual dollar amount is achieved. Once the preprogrammed criterion has been satisfied credit card transactions requiring "Settlement" can then be routed to a second credit bureau. Processing then moves to block 1506.

In block 1506, non-credit card and POST-VEND transactions not requiring any additional third party port processing (i.e. by way of a credit bureau) are "settled" by posting the POST-VEND transaction data, by way of DII processing (as required) to the appropriate remote location, or on-site or off-site database. The universal server can be preprogrammed to store POST-VEND transaction and "batch" post transaction data based on a preprogrammed criteria. Such "batch" posting preprogrammed criteria can be based in part on date, time, or quantity of transactions, transaction dollar amount, availability of the database or remote location, or other cost, performance or preferences. The term "batch" processing is defined as the process of posting any number of transactions at once in a formatted block of data. Processing then moves to block 1508.

In block 1508, POST-VEND transactions reliant on a third party processor (i.e. credit cards) are processed in accordance with preprogramming of the universal server. Preprogramming of the universal server can include processes and procedures disclosed in block 1504, and 1506. Processing then moves to block 1510.

In block 1510, the universal server determines whether the POST-VEND transaction processing was successful. If the POST-VEND transaction processing was not successful, that is, the universal server was unable to post process the POST-VEND transaction, then the universal server can data communicate the "unsettled" post vend transaction to a remote locate. Such a remote location can be a computer center that monitors the functionality of a plurality of universal servers. The remote location can be remote location 606, 616, 618, 634, or 636. Processing control is then returned to the calling procedure.

Figure 18:
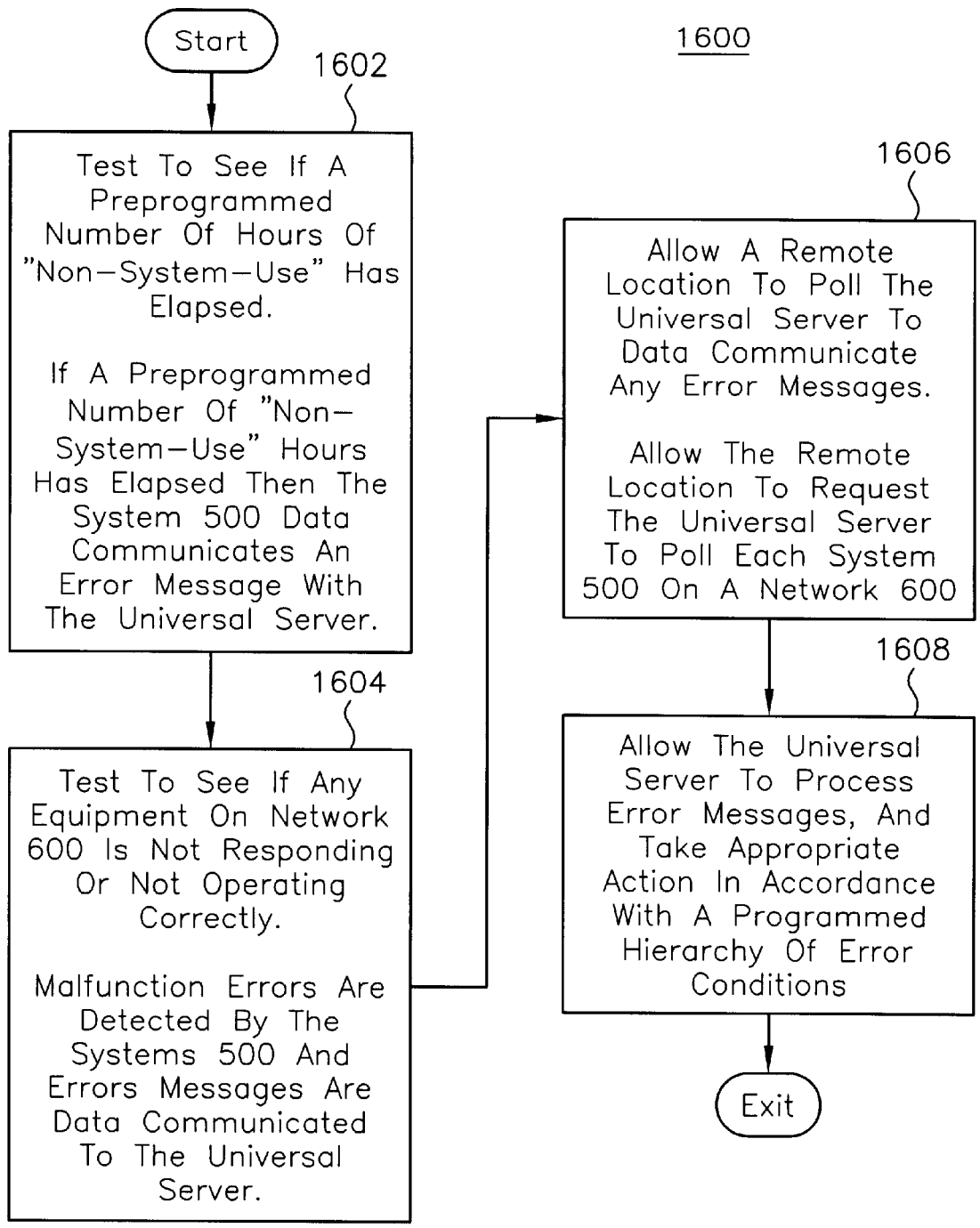
FIG. 18 shows an error detection routine 1600 flowchart.

There is shown in FIG. 18, an error detection routine 1600. Processing begins in block 1602, wherein a test is performed. A test is performed to determine if a preprogrammed number of hours have elapsed. Each hour a system 500 or a vending machine interconnected with a system 500 is not operated successfully (a complete vend cycle) by a customer, a non-use timer is incremented. When a preprogrammed number of non-use hours has occurred, an error message can be generated by a system 500 and data communicated to the universal server. Alternatively, the universal server can generate an error message. In either case, the universal server can record the non-use error message and can act as appropriate and programmed to respond. Processing then moves to block 1604.

Processing in block 1604, detects if a malfunction has occurred with a system 500, a vending machine interconnected with a system 500, or a printer, such as printer 69A or 69B. Other vending machines and data processing equipment on network 600 can also be tested for malfunctions. Malfunction error messages that are detected by a system 500 can be data communicated to the universal server. Malfunctions determined by the universal server are also recorded. In either case, the universal server can record the error message and can act as appropriate and programmed to respond. Processing then moves to block 1606.

Processing in block 1606, allows a remote location, such as remote location 606, 616, 618, 634, or 636 to poll the universal server for any error conditions that may have been detected or may exist on a network 600 controlled by the universal server. Furthermore, when a request from a remote location to a universal server is data communicated the universal server can poll each system 500 on a network 600. The polling is equivalent to requesting each system 500 to perform a self-test, and to perform a test to determine if the vending machine interconnect with said system 500 is operating correctly. Processing then moves to block 1608.

In block 1608, processing of a detected error condition occurs. The universal server can processes error condition messages in accordance with a hierarchy of error types and severity criteria. Error types that are classified as "severe" can cause the universal server to data communicate with a remote location, such as remote location 606, 616, 618, 634, or 636 immediately upon the error being detected. An example of an error type that may be classified as "severe" can be a breach of security detected by way of an alarm means 524.

An error type classified and "not severe" can be stored in the universal server or in a database that the universal server has access to until such time a regular, or normally scheduled data communication occurs with a remote location. An example of a "not severe" error can be a printer 69A, or 69B "out-of-paper" condition.

Error conditions whether "severe" or "not severe" can trigger a system 500 located on network 600 to alert customer service, or other technical personal to correct the error. For example, an error signal can be audio produced at a front desk or security office, should an error, such as a breech of security be detected. In addition, the universal server can route different types of error messages to different locations. For example, a service related error can result in an electronic fax being sent to a remote service location, and a breech in security error can be routed to a security office. Processing then returns to the call procedure.

While this invention has been described with reference to specific embodiments, it is not necessarily limited thereto. Accordingly, the appended claims should be construed to encompass not only those forms and embodiments of the invention specifically described above, but to such other forms and embodiments, as may be devised by those skilled in the art without departing from its true spirit and scope.

What is claimed is:

1. A vending control system for use with an interactive network and for permitting a vend of at least one product associated with at least one vending machine having one or more products, comprising:

a) a plurality of public access electronic commerce terminals, each of said plurality of terminals i) allowing a user to select said vend of said at least one product from said at least one vending machine and ii) facilitating an incentive-based vend of said at least one product through said vending machine, each said public access electronic commerce terminal including:

a controller for controlling vending by said at least one vending machine, equipment control means interconnected with said controller for interfacing said controller to said at least one vending machine, identification means for i) accepting at least one of a plurality of identification inputs from said user and ii) effectuating a selective dynamic identification interchange of said at least one of said plurality of identification inputs from said user, storage means in communication with said controller for storing a plurality of incentive-based advertising referencing terms for an incentive for said user, presentation means in communication with said controller for presenting said user with said incentive-based advertising, comparison means for comparing said user selection to said terms for said incentive, controlling means for controlling a delivery of said incentive to said user in response to said comparison means, first determining means for determining whether a period of non-use of said electronic commerce terminal has occurred, second determining means for determining if said period of non-use exceeds a predetermined time period and generating an output signal, and generating means for generating an error message based on the output signal from said second determining means;

b) networking means for interconnecting said plurality of public access electronic commerce terminals over said interactive network;

c) third determining means for determining if at least one of a system limit and an authorization limit of said user is at least one of reached and exceeded;

d) reauthorizing means for reauthorizing said user based on an output of said third determining means; and e) reprocessing means for reprocessing said vend based on said reauthorization.

2. The network of claim 1, wherein at least one of said plurality of public access electronic commerce terminals is adapted to receive data from a user.

3. The network of claim 2, wherein at least one of said plurality of public access electronic commerce terminals is adapted to store data received from a user.

4. The network of claim 3, wherein at least one of said public access electronic commerce terminals is adapted to download data to at least one universal server interconnected to said network.

5. The network of claim 4, wherein at least one of said universal servers is adapted to store data downloaded from at least one of said plurality of public access electronic commerce terminals.

6. The network of claim 1, further comprising means for prompting a user to input data into at least one of said public access electronic terminals in response to text and/or graphics displayed on said public access electronic commerce terminal.

7. The network of claim 1, further comprising means for displaying text and/or graphics on at least one of said public access electronic terminals in response to data, wherein data is input into said public access electronic commerce terminal by a user and downloaded to at least one inter connected universal server.

8. The network of claim 1, further comprising:
means for receiving identification data from a user,
means for matching said identification data with other identification data, and
means for using said other identification data in a commercial transaction.

9. The network of claim 1, further comprising:
means for enabling/disabling at least one interconnection between at least one of said plurality of public access electronic terminals and at least one universal server.

10. The network of claim 1, further comprising:
means for enabling and/or disabling at least one interconnection between at least one of said plurality of public access electronic terminals and at least one interconnected universal server,
means for downloading graphic and or text data from said at least one universal server to at least one of said public access electronic commerce terminals while said interconnection is enabled, and
means for, displaying said downloaded text and/or graphics data on said public access electronic commerce terminal while said interconnection is disabled.

11. The network of claim 1, wherein each of the plurality of public access electronic commerce terms is addressable.

12. The network of claim 9, further comprising:
means for determining when said interconnection should be enabled or disabled.

13. The network of claim 7, wherein said incentive based advertising includes text and/or graphic data which contains data regarding timing of said display of said data.

14. The network of claim 9, wherein said at least one universal server further comprises means for data processing.

15. The network of claim 1, wherein at least one said plurality of vending machines is one of the following, copier, telephone, facsimile machine, printer, notebook computer, palmtop computer, microfiche device, projector, scanner, camera, modem, beverage type vending machine, snack type vending machine, or prepaid phone card vending machine.

16. The network of claim 14 wherein said at least one universal server is adapted to function as: internet site, credit bureau, or service center.

17. The interactive network according to claim 1, wherein said networking means further comprises at least one of the following: a): a local area network interface, b) a wide area network interface, c) a modem interface, d) a wireless communication interface, e) a carrier current communication interface, and f) a hard wired interface.

18. An interactive network comprising:
a) a plurality of vending machines;
b) a plurality of public access electronic commerce terminals having i) a plurality of microcontrollers and ii) communication means for communicating with a communication network, each said public access electronic commerce terminal including:
a controller for controlling vending by said plurality of vending machines,
equipment control means interconnected with said controller for Interfacing said controller to said plurality of vending machines,
identification means for i) accepting at least one of a plurality of identification inputs from said user and ii) effectuating a selective dynamic identification interchange of said at least one of said plurality of identification inputs from said user,
storage means in communication with said controller for storing a plurality of incentive-based advertising referencing terms for an incentive for said user,
presentation means in communication with said controller for presenting said user with said incentive-based advertising,
comparison means for comparing said user selection to said terms for said incentive, and
means for controlling a delivery of said incentive to said user in response to said comparison means;
c) first determining means for determining whether a period of non-use of said electronic commerce terminal has occurred;
d) second determining means for determining if said period of non-use exceeds a predetermined time period and generating an output signal;
e) generating means for generating an error message based on the output signal from said determining means;
f) a plurality of universal servers operably linked with said plurality of public access electronic commerce terminals over said communication network for managing vending transactions;
g) third determining means for determining if at least one of a system limit and an authorization limit of said user is at least one of reached and exceeded;
h) reauthorizing means for reauthorizing said user based on an output of said third determining means; and
i) reprocessing means for reprocessing said vend based on said reauthorization.

19. The interactive network according to claim 18, wherein said plurality of vending machines includes at least one of the following types of vending machines: copier, telephone, facsimile machine, printer, data-port, laptop print station, notebook computer, palmtop computer, microfiche device, projector, scanner, camera, modem, communication access, personal computer, PC terminal, network computer, beverage type vending machine, snack type vending machine, or prepaid phone card vending machine.

20. The interactive network according to claim 18, wherein said public access terminal further comprises:
means for counting external events;
means for timing external events;
means for controlling a keyboard;

means for controlling an electronic mouse;

means for interfacing with a telephone; and means for enabling and/or disabling usage of a printer and/or modem.

21. The interactive network according to claim 18, further comprising a means for identifying a user, the means for identifying a user including at least one of the following:
   a) smart card reader;
   b) magnetic card reader;
   c) debit card reader;
   d) pre-paid card reader;
   e) means for reading a means for unlocking a doorlock;
   f) means for voice recognition;
   g) means for handwriting recognition;
   h) bar code reader, and
   i) means for reading biometric data.

22. The interactive network according to claim 21, wherein said means for reading biometric input further comprises at least one of the following: finger print reader, palm reader, hand reader, iris scan reader, or microphone.

23. The interactive network according to claim 21, wherein said magnetic card reader is adapted for reading a credit card, automated teller card, or a bank or private issued card.

24. The interactive network according to claim 18, further comprising communication means which operates with at least one of the following network protocols: a) wireless, b) wired, c) RS232, d) RS485, e) ethernet, f) token ring, g) TCP/IP, and h) net bouy.

25. The interactive network according to claim 18, wherein said server means performs at least one of the following functions:
   a) storing said plurality of advertising data;
   b) transferring said plurality of advertising data to at least one of said plurality of universal servers;
   c) processing said electronic commerce transactions;
   d) processing of serial card transactions; and
   e) performing a dynamic identification interchange.

26. The interactive network according to claim 25, wherein said server means functions at least one of the following:
   a) online service desk;
   b) internet site;
   c) credit bureau;
   d) customer service data;
   e) security system;
   f) property management system;
   g) point of sale system, or
   h) management internet system.

27. A vending control system for use with an interactive network comprising:
   a) a plurality of public access electronic commerce terminals, each of said plurality of public access electronic commerce terminals i) allowing a user to select a vend of at least one product from at least one vending machine and ii) facilitating said vend of said at least one product through said vending machine, each said public access electronic commerce terminal including:
      a controller for controlling vending by said at least one vending machine,
      equipment control means interconnected with said controller for interfacing said controller to said at least one vending machine,
      identification means for i) accepting at least one of a plurality of identification inputs from said user and ii) effectuating a selective dynamic identification interchange of said at least one of said plurality of identification inputs from said user,
      storage means in communication with said controller for storing at least one of an award and special pricing as an incentive for said user,
      presentation means in communication with said controller for presenting said user with said incentive,
      comparison means for comparing said user selection to said terms for said incentive, and
      controlling means for controlling a delivery of said incentive to said user in response to said comparison means;
   b) first determining means for determining whether a period of non-use of said electronic commerce terminal has occurred;
   c) second determining means for determining if said period of non-use exceeds a predetermined time period and generating an output signal;
   d) generating means for generating an error message based on the output signal from said second determining means;
   e) networking means for interconnecting said plurality of public access electronic commerce terminals over said interactive network;
   f) third determining means for determining if at least one of a system limit and an authorization limit of said user is at least one of reached and exceeded;
   g) reauthorizing means for reauthorizing said user based on an output of said third determining means; and
   h) reprocessing means for reprocessing said vend based on said reauthorization.

* * * * *